(12) United States Patent
Kessler et al.

(10) Patent No.: US 12,517,474 B2
(45) Date of Patent: Jan. 6, 2026

(54) SYSTEM AND METHOD FOR MONITORING SAFETY EQUIPMENT

(71) Applicant: Eaton Intelligent Power Limited, Dublin (IE)

(72) Inventors: John W. Kessler, Saint Peters, MO (US); Michael Craig Henricks, Ballwin, MO (US)

(73) Assignee: Eaton Intelligent Power Limited, Dublin (IE)

( * ) Notice: Subject to any disclaimer, the term of this patent is extended or adjusted under 35 U.S.C. 154(b) by 387 days.

(21) Appl. No.: 18/174,472

(22) Filed: Feb. 24, 2023

(65) Prior Publication Data

US 2024/0288837 A1 Aug. 29, 2024

(51) Int. Cl.
*G05B 9/02* (2006.01)
*H04B 17/318* (2015.01)
(Continued)

(52) U.S. Cl.
CPC .............. *G05B 9/02* (2013.01); *H04B 17/318* (2015.01); *H04W 4/025* (2013.01); *H04W 4/80* (2018.02); *H04W 4/90* (2018.02)

(58) Field of Classification Search
CPC ............ G06Q 10/06315; A41D 13/002; A41D 13/0002; F16P 3/147; A62B 99/00; G05B 9/02
See application file for complete search history.

(56) References Cited

U.S. PATENT DOCUMENTS

| | | | |
|---|---|---|---|
| 6,868,360 B1 | 3/2005 | Olstad | |
| 2017/0372216 A1 | 12/2017 | Awiszus | |
| 2019/0073618 A1* | 3/2019 | Kanukurthy | ............ G08B 21/02 |

(Continued)

FOREIGN PATENT DOCUMENTS

| | | | |
|---|---|---|---|
| GB | 2571118 A | 8/2019 | |
| WO | WO 2017181036 A1 | 10/2017 | |

OTHER PUBLICATIONS

International Search Report and Written Opinion for International Application No. PCT/EP2022/ 025385, 13 pages, Jan. 24, 2022.

(Continued)

*Primary Examiner* — Mark A Connolly
(74) *Attorney, Agent, or Firm* — Baker Botts L.L.P.

(57) ABSTRACT

A method implemented with an equipment computing device associated with safety equipment. The step includes determining that the equipment computing device is in an environment that requires safety equipment to be worn. The method determines environmental data based on the determination that the equipment computing device is in the environment. The method then determines operation metrics of the environment based on the environmental data and then determines a list of predetermined safety gears along with safety-related data that are applicable for the operation metrics. A set of identification indicators including real-time operative information is acquired from each of one or more safety gears of the safety equipment. The method then detects and indicates that the one or more safety gears along with one or more operative measures are present in the safety equipment for operating according to the determined operation metrics of the environment by comparing the acquired set of identification indicators including the real-time operative information of each of the one or more safety gears with each of the predetermined safety gears and the safety-related data of each of the predetermined safety gears. The method assigns one of the one or more safety gears as a primary gear to verify each of the one or more safety gears, the primary gear is communicating with each of the one or more safety gears through any of Bluetooth, Bluetooth mesh, Radio Frequency Identification (RFID), Zigbee, Wireless Body Area Network (WBAN) and Near Field Technology (NFC) for acquiring the identification indicators includ- (Continued)

ing the real-time operative information from each of the one or more safety gears.

20 Claims, 8 Drawing Sheets

(51) Int. Cl.
*H04W 4/02* (2018.01)
*H04W 4/80* (2018.01)
*H04W 4/90* (2018.01)

(56) References Cited

U.S. PATENT DOCUMENTS

2021/0372561 A1* 12/2021 Swift ................. A41D 13/0002
2021/0374469 A1* 12/2021 Molapo ................. G06F 18/214

OTHER PUBLICATIONS

Vera, et al., "Passive RFID-enabled proximity sensor", May 2016, 2016 IEEE/MTT-S International Microwave Symposium—MTT 2016, 4 pages, May 2016.

Smart Safety, IoTTECH Nologies and Cutting-EOG E Functionalities to Managethesafelyof Production Sites and Employees, retrieved on Mar. 28, 2023, 5 pages. https://www.industrial-iot.it/en/smart-safety/#1532699122193-5662b4d4-6be3, Mar. 28, 2023.

Chandel, et al., "ProxiTrak a robust solution to enforce real-time social distancing & contact tracing in enterprise scenario", UbiComp-ISWC '20: Adjunct Proceedings of the 2020 ACM International Joint Conference on Pervasive and Ubiquitous Computing and Proceedings of the 2020 ACM International Symposium on Wearable Computers, (Sep. 2020) pp. 503-511. https://dl.acm.org/doi/abs/10.1145/3410530.3414599, Sep. 2020.

* cited by examiner

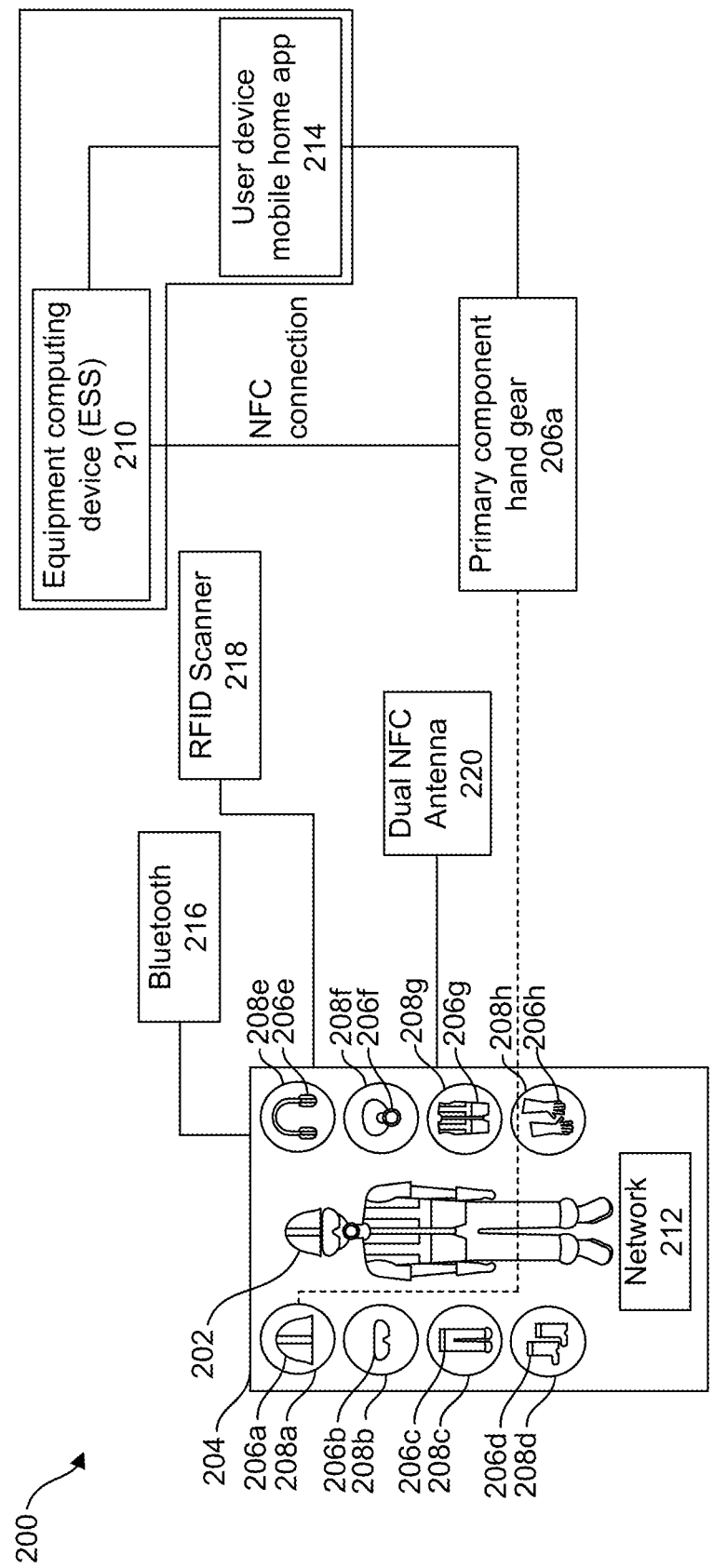

SYSTEM AND METHOD FOR MONITORING SAFETY EQUIPMENT

TECHNICAL FIELD

This disclosure generally relates to a computer-implemented safety equipment, and more particularly to computer-implemented wearable systems and methods for verifying safety equipment and one or more safety gears for operating in an environment.

BACKGROUND

A variety of different types of personal protective equipment (PPE) are required by a host of healthcare, industrial, utility, and trade workers to provide a degree of protection from known risks in the hazardous environments where workers work. For example, to help in maintaining worker's safety and health, the workers may be required to don, wear, carry, or otherwise use a personal protective equipment (PPE) article, if the workers enter or remain in work environments that have hazardous or potentially hazardous conditions. Some of known types of PPE articles include, without limitation, respiratory protection equipment (RPE), e.g., for normal condition use or emergency response; protective eyewear, such as visors, goggles, filters or shields; protective headwear, such as hard hats, hoods or helmets; hearing protection devices; protective shoes; protective gloves; other protective clothing, such as coveralls and aprons; protective articles, such as sensors, safety tools, detectors, global positioning devices, mining cap lamps and any other suitable gear. In some instances, a worker may operate in multiple different work environments over the course of a particular time interval (e.g., day, week, etc.). Conventionally, for example, such PPE may be not designed to protect workers against risks of airborne disease that are now of much concern in the workplace. The risk associated with transmission of airborne diseases may be affected positively or negatively by environmental factors such as temperature, humidity, and ventilation that may not be easily assessed by human persons or accounted for in existing PPE protocols.

Conventional computer-implemented monitoring systems exist that intelligently incorporate sensors to create a degree of situational awareness of risks posed to workers but known systems of this type generally lack capability to detect specific health risk and PPE issues associated with individuals in a particular environment, and specifically lack capability to intelligently assess risks of airborne disease transmission. Additionally, maintaining the safety and health of workers is a major concern across many industries. Various rules and regulations have been developed to aid in addressing this concern. However, the rules and regulations fail to administer proper safety of the workers for a particular work session.

Therefore, there is a need to improve determining the factors associated with a particular operation in a particular environment and then recommending appropriate PPE units and components according to the worker's comfort parameters.

The embodiments disclosed herein are only examples, and the scope of this disclosure is not limited to them. Embodiments may include all, some, or none of the components, elements, features, functions, operations, or steps of the embodiments disclosed herein. Embodiments according to the invention are disclosed in the attached claims directed to a method, a storage medium, a system, and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (multiple dependencies) can be claimed as well so that any combination of claims and the features thereof are disclosed and can be claimed regardless of the dependencies chosen in the attached claims. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

SUMMARY OF PARTICULAR EMBODIMENTS

Embodiments of the present disclosure provide a method and system for verifying a safety equipment against hazardous environment. The method and system relate to verifying safety equipment and safety gears that may be specified for, for example, PPE kit/unit with PPE gears. In an embodiment, the safety gears may be verified that may be installed and integrated into the safety equipment, via an equipment computing device. In particular, the present disclosure provides the methods and systems that may be implemented by the equipment computing device which may be associated with the safety equipment and the one or more safety gears. In an embodiment, the equipment computing device may be integrated into a mobile device (monitoring device) and may be implemented as mobile application for verifying the set of safety gears in the safety equipment. The equipment computing device may be configured to be implemented as an integrated smart electrical safety system (ESS) that may communicate with a set of safety gears and the safety equipment itself for: (a) verifying whether the appropriate safety gears or components are present, missing or worn by a worker for a given work hazard or the hazardous environment. In particular, the methods and systems that may be integrated into the PPE clothing and may allow the PPE clothing to communicate wirelessly with the set of the safety gears to verify that the set of safety gears and the PPE equipment is not only being worn but also being worn in an appropriate manner for the given work hazard or the hazardous environment. In this manner, the equipment computing device indicates and/or alerts the worker that the safety equipment may be present indicating that the safety equipment is appropriately equipped or may not be present indicating that the safety equipment is under-equipped for the given work hazard or the hazardous environment which may be riskier or faulted against a particular operation metrics in that hazardous environment. The communication and connectivity between the mobile device having equipment computing device and the safety equipment including the safety gears may be enabled via wireless network, for example, Bluetooth, Bluetooth mesh, Ultra-High Frequency Radio Frequency Identification (RFID), Zigbee, Wireless Body Area Network (WBAN), Near Field Technology (NFC), and other range connection. In this manner, number of connections needed between a set of safety gears and the mobile device having the equipment computing device may be minimized which may reduce the complexity related to the limitation of simultaneous connections attained by the computing device. Further, the equipment computing device, for example, being the integrated smart ESS may be configured to: (b) verify whether all the safety gears and the associated safety equipment are in place, and functional with appropriate operative measures to work under a detected work hazard or the hazardous environment. For example, the mobile device having the mobile application with the functionalities of the equipment computing device, verifies that the safety gears are integrated into the PPE in proper manner and are operational with configuration meant to operate according to the operation metrics in the environment. In this manner, the user or worker wearing such safety equipment may be protected against risky and/or severe hazardous environmental impact and effects.

In particular embodiments, disclose a method for monitoring and verifying safety equipment and safety gears. In particular, the method verifies whether required set of safety gears are present and integrated in the safety equipment i.e., PPE equipment for a work hazard or hazardous environment that may be determined by a monitoring device. The monitoring device, for example includes, a mobile device having mobile application embedded with equipment computing device and is present in an environment that requires safety equipment to be worn by a worker for safety. In particular embodiments, the method may be implemented with the equipment computing device which may be, for example, integrated smart electrical safety system (ESS), and that may be implemented as a mobile application of the mobile device that may be present in the environment requiring the safety equipment to be worn. The method may include determining that the equipment computing device is in an environment that requires safety equipment to be worn. For example, a supervisor or a worker or an administrator may be having the mobile device and present in the environment. In an embodiment, the environment may be any environment exposed to risky conditions and undesirable exposure to harmful and hazardous event, for example, fire or explosion, shock, chemical burns, airborne disease, virus spread, etc. From the harmful and hazardous environment, the environmental data may be determined by the equipment computing device analyzing the environment. The environmental data may include contextual data, intensity-related data, and hazardous parameters associated with such environment. The contextual data may include, without limitation, the context of the environment with which assistance of the workers are appropriate and requiring workers to be equipped appropriately according to the detected context. For example, contextual data may be related to context of the environment exposed to events that may include, without limitation, blast, leakage of the chemical, electrical shock, fire, explosion, burns, contaminant situation or any harmful elements in a particular establishment or environment. In an embodiment, the contextual data may be related to a location of the environment, a boundary or perimeter of the environment, an area of the work environment, hazards detected or determined within and around the environment, and physical conditions of the environment. In an example, the contextual data may also include one or more features that may be predicted based on captured and received environmental data of the environment. In an example, the prediction of the one or more features may include, but are not limited to, impact and effect on the environment, prediction of an exposure of any of events on the environment, one or more persons present in and around the environment, one or more persons related assistance measures that may be required for assisting the one or more persons to relieve from the impact and conditions of environment, and other predictive measures required from the workers for a particular condition and effect of the environment. In an embodiment, the intensity-related data of the environmental data may include, but not limited to, level of events or hazards, for examples, extensive level of hazard, minimal level of hazard. For example, extensive level may be related to fire event in the environment where a mask needs to be worn due to respiratory concerns, heat stress based on area or temperature. In an embodiment, the level of events may also include geographic regions of the environment where unusual occurrence of unsafe event occurs, noise level which may be a condition that an area or the environment of interest causes the risk for workers or users for noise induces hearing loss that may be determined from the at least one environment sensor. In this instance, the worker wearing a noise dosimeter may send noise data to a data hub or the equipment computing device or the ESS that may determine and detect the kinds of PPE clothing required for operating according to such work condition or task in the environment of interest. In an embodiment, the hazardous parameters associated with the environment may include, but are not limited to, risky, and unsafe conditions that are associated with the harmful events of any intensity, for example, blast, leakage of the chemical, electrical shock, fire, explosion, burns, contaminant situation or any harmful elements. The method then determines operation metrics of the environment that require assistance of PPE workers or PPE users. The operation metrics may be determined based on at least one of environmental data. In an embodiment, the operation metrics may include, but not limited to, tasks, work sessions, worksite, kinds of tasks, types of operations, for example, protecting operations relating to protect the people in the environment from fuses, dangerous emissions and particles and potential damages to the machinery and buildings influenced by environmental factors, or against emissions in the harsh and hazardous environment. In an embodiment, a list of predetermined safety gears along with safety-related data may be determined that may be applicable for the operation metrics. The list of predetermined safety gears may be determined based on the environmental data and the operation metrics. The predetermined safety gears may be determined and logged in a memory, or a storage device or registry and these safety gears may be appropriate for the operation metrics or tasks, or work sessions required or performed recently, or in the past. For example, in the case of electrical fuses where the fuses of higher electrical ratings may pose a greater risk than fuses of lower electrical ratings. In such scenarios, the operation metrics may be related to the need of replacing such fuses under energized circuit conditions. Such operation metrics require different amounts and types of PPE to be worn by the worker for replacing one such fuse. For example, PPE may be required to be installed with helmet, eye protective glasses, face shields, gloves and hearing protection, bodysuit of a particular weight and garment, vest, etc. In an embodiment, the predetermined safety gears may be integrated in the PPE equipment which may be used or utilized for operating a particular work session or the task in the environment in the past. For example, if the hazardous environment may be related to a healthcare scenario, to protect against airborne diseases contamination, the safety equipment and safety gears may require including, without limitation, PPE kit, face shield, gloves, shoes, aprons, or lab coat, oxygen cylinder, eye protective gears, masks, etc. The method then acquires a set of identification indicators including real-time operative information from each of one or more safety gears of the safety equipment. The identification indicators of the one or more safety gears may be corresponding to the safety equipment or PPE unit that may be required for the worker or professional to wear in real time i.e., in current scenario or presently according to the operation metrics of the hazardous environment. In an embodiment, in real-time and dynamically, identification indicators of the one or more safety gears may be detected via their associated unique tags, identifiers or labels or any kind of electronic tracking identifiers associated with each of the one or more safety gears that allows automatic detection of the PPE safety gears identification and configuration. The real-time operative information defines, without limitation, functional configuration and settings associated with ability of usage for the operation metrics in the hazardous environment, operative parameters matching the list of predetermined safety gears and safety-related data for operating efficiently in the environment of interest. In an embodiment, the real time operative information may also specify comfort level of the wearer, strength, and durability of the one or more safety gears, lifetime of the safety gear, connectivity capacity with the equipment computing device and other proximal computing devices and gears, and other related operative information that may be counted against work session or operative metrics in the hazardous environment. In an embodiment, the set of identification indicators including the real-time operative information from each of the one or more safety gears of the safety equipment may be acquired via through Bluetooth, Bluetooth mesh, Radio Frequency Identification (RFID), Zigbee, Wireless Body Area Network (WBAN) and Near Field Technology (NFC). Based on the list of predetermined safety gears and the safety-related data of each of the predetermined safety gears, one or more safety gears may be detected to be present in the PPE equipment currently (presently) and indicated along with one or more operative measures. In an embodiment, the safety gears may be detected and indicated that may be present in real-time or currently in the safety equipment when the acquired set of identification indicators including the real-time operative information of each of the one or more safety gears are similar or matches or parallel with each of the predetermined safety gears and the safety-related data of each of the predetermined safety gears respectively. In an embodiment, the method also detects whether the one or more safety gears are missing from the safety equipment indicating that the wearer may be under-equipped and/or the one or more safety gears are non-operational due to lack of capacity of operative information as per required operative metrics in the hazardous environment. In an embodiment, the method also detects whether each of the one or more safety gears are rated with safety gears configuration appropriate to operate according to the operation metrics of the environment along with detecting whether the worker is missing with the one or more safety gears with the rated safety gear configuration based detecting that the acquired set of identification indicators including the real-time operative information of each of the one or more safety gears are not similar to each of the predetermined safety gears and the safety-related data of each of the predetermined safety gears. In a situation of non-operational, the safety gears may require formatting or updating of the operative information based on the operative measures determined from the predetermined safety related data of the predetermined safety gears and/or that may be determined dynamically through prediction on the operative metrics of the environment. In an embodiment, the indication of the one or more safety gears and the operative measures may be achieved via any of visual interface, audio interface, tactile interface, text, video interface, vibration, speakers, vibration devices, light emitting diodes (LEDs), buzzers or other outputting alerts, audio messages, and radio-frequency signals indicating correction, calibration, renewal of the one or more safety gears. In an embodiment, indicating the workers or any supervisor on the presence of safety gears, or missing of safety gears (i.e., under-equipment) or fault in operation, informs the workers whether the workers are protected appropriately from hazard prone environment and prevents workers from harsh and harmful events.

In particular embodiments, disclose a system comprising an equipment computing device associated with safety equipment and safety gears that may be required to be worn by a worker in real time in a hazardous environment. The equipment computing device may be integrated or embedded in a monitoring device, for example, a mobile device as a mobile application and linked to the safety equipment and the safety gears. In an embodiment, the equipment computing device may be communicating with a primary gear/component which may be any of the safety gears in the safety equipment. In an example, the one of the safety gears may be assigned as the primary gear for receiving identification indicators from the other safety gears through Bluetooth, Bluetooth mesh, Radio Frequency Identification (RFID), Zigbee, Wireless Body Area Network (WBAN) and Near Field Technology (NFC) and verifying the other safety gears. In such scenario, the primary gear may be the one with all the configuration and functionalities that are required in the gear to become the primary gear for rest of the safety gears in the safety equipment. Further, in an embodiment, the one of the safety gears being the primary gear communicates with a worker's monitoring device, for example, mobile application, laptop, phones, computer systems and other kinds of systems of users to determine status of not only of the safety equipment but also status of other safety equipment at the proximity. The system also detects whether each of the safety gears of other safety equipments are rated with safety gear configuration and verifying a set of the gears of the safety equipment for the particular operation metrics. The status of any safety equipment including associated safety gears may be determined and detected by the equipment computing device through wireless network. In this way, the workers or any supervisor may be indicated that the safety equipment is present with the required safety gears or missing the safety gears equivalent to safety equipment to be under-equipped or that the one or more safety gears are non-functional based on the analyzed status. In an embodiment, the system may utilize a plurality of sensors to determine the environment related data where the requirement of wearing an appropriate safety equipment is necessary. The system may utilize detectors, for example, heat detectors, skin conductance detector and other kinds of workers related detectors to determine whether the safety equipment and the safety gears are being worn by the worker, and whether the safety equipment and safety gears may be integrated with configurations and operative measurement appropriate for the detected hazardous environment. In an embodiment, the system, via detectors, determines whether the safety equipment and the safety gears are worn in appropriate manner by the workers. The system may also utilize motion sensors, for example, accelerometer, gyroscope etc., to detect movements of each of the one or more safety gears based on communicating with any of motion sensors associated with the corresponding one or more safety gears and signal strength of communication of each of the one or more safety gears with the primary gear or the equipment computing device or the monitoring device itself, and verifying whether the one or more safety gears are being worn in proper manner. The system also detects whether the one or more safety gears are rated with safety gear configuration according to the particular operation metrics, or whether one or more safety gears are missing for operating according to the particular operation metrics of the environment or whether the user is missing the one or more safety gears with rated safety gear configuration when the acquired set of identification indicators including the real-time operative information of each of the one or more safety gears are detected to be not similar to each of the predetermined safety gears and the safety-related data of each of the predetermined safety gears. The system may comprise a registry that logs each operation metrics, for example work session, required in the hazardous environment, status of the safety equipment and safety gears. The system indicates the worker who may be equipped appropriately having presence of all the required safety gears in the safety equipment, under-equipped when even one of the safety gears are not present and/or the safety gears and safety equipment may be non-functional according to the operation metrics of the environment. The system indicates such detection and verification with explanation on any of visual interface, audio interface, tactile interface, text, video interface, vibration, speakers, vibration devices, light emitting diodes (LEDs), buzzers or other outputting alerts, audio messages, and radio-frequency signals indicating correction, calibration, renewal of the one or more safety gears and the one or more safety components.

In particular embodiments, present disclosure provides an application that monitors or tracks whether the worker may be wearing an appropriate safety equipment, for example, PPE unit. The application detects whether the worker may be wearing appropriate safety gears for a particular task at hand. Based on the detection, the worker may be indicated that the worker may be appropriately equipped, under-equipped and/or the safety gears and safety equipment may be non-functional along with indication of reasons of non-functional parameters.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are disclosed in the attached claims directed to a method, a storage medium, a system, and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (multiple dependencies) can be claimed as well, so that any combination of claims and the features thereof are disclosed and can be claimed regardless of the dependencies chosen in the attached claims. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

Non-limiting and non-exhaustive embodiments are described with reference to the following Figures, wherein like reference numerals refer to like parts throughout the various drawings unless otherwise specified.

FIG. 2A and FIG. 2B illustrates a primary component of a safety equipment and safety gears along with an example of Bluetooth connection, radio frequency identification (RFID) connection with RFID scanner and NFC connection for detecting identification of each safety gear in the PPE according to an embodiment.

DESCRIPTION OF EXAMPLE EMBODIMENTS

Figure 1:
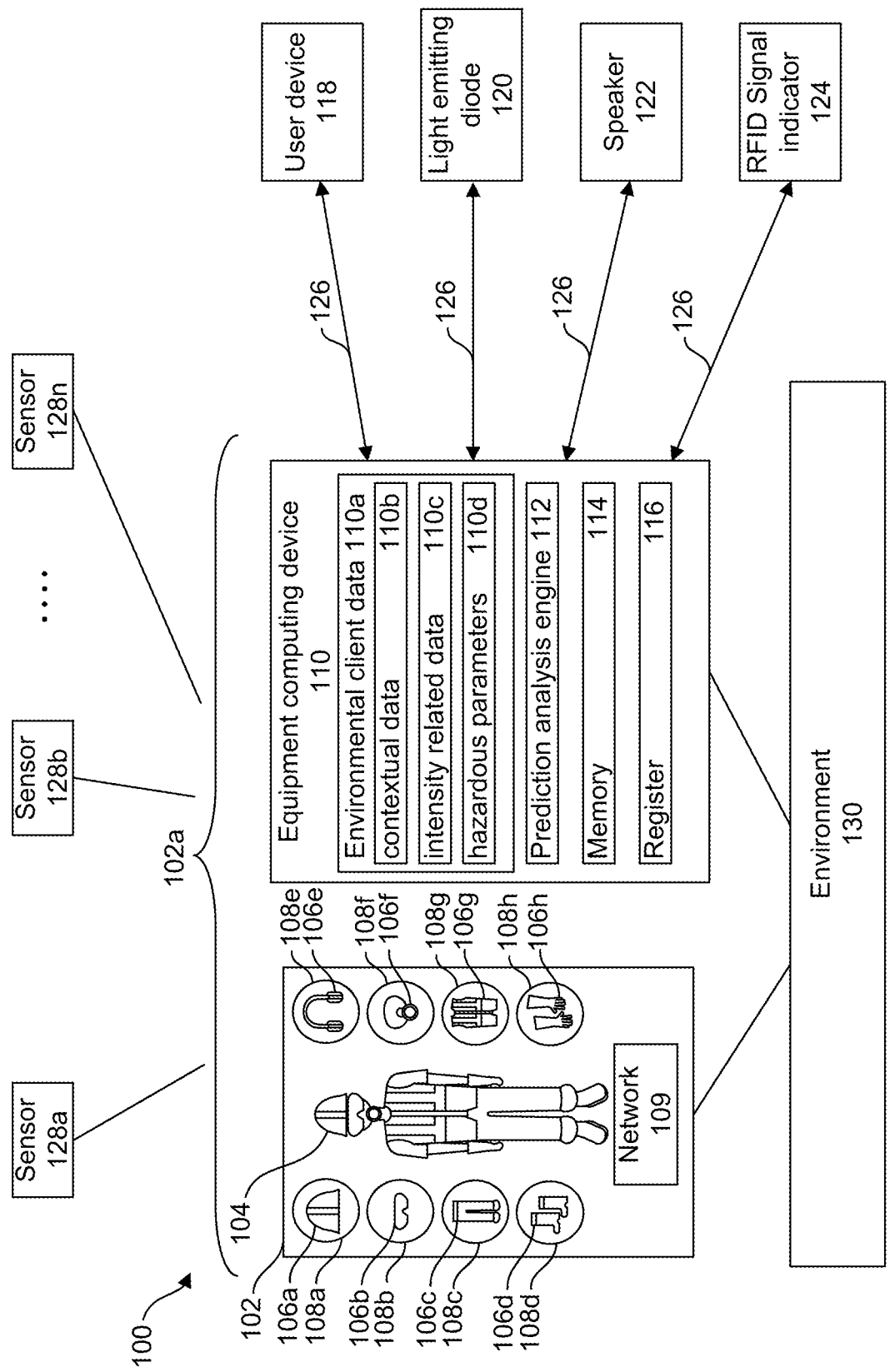
FIG. 1 illustrates a computing system having safety equipment equipped with safety gears and an associated equipment computing device according to a context of use and principal functional elements with which one embodiment could be implemented.

In the following description, for the purposes of explanation, numerous specific details are set forth to provide a thorough understanding of the present invention. It will be apparent, however, that the present invention may be practiced without these specific details. In other instances, well-known structures and devices are shown in block diagram form to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

FIG. 1 illustrates a system 100 shows an example personal protection equipment (PPE) unit 102 wearable by a worker 104 in an environment 130. The environment 130 may represent a physical environment, such as work environment, home, house, entities, space or areas, and any physical environment that may relate to any kind of environment such as office, hospital, school premises, and the like establishments and entities. Some examples of environment 130 may include, but are not limited to, petroleum refineries, healthcare facilities, home, housing communities, electrical systems space, petrochemical plants, grain silos, wastewater and/or treatment facilities, establishments, or other industrial facilities in which sustained or volatile conditions in the ambient environment may be present. In a normal situation, the environment 130 may not be exposed to any hazard or unusual condition. In particular, each environment 130 may have different safety requirements maintained by several different devices, tools, systems installed or integrated for such environment 130. Some harmful events, for example, abnormal functionalities of devices, tools, systems, shock, leakage, blasts, impact, fire, explosion, chemical burns, contaminants conditions, low-lighting, uneven surfaces, voids, noise, heat, etc., may cause the environment 130 to be the hazardous environment. In an embodiment, the environment 130 may be the environment of interest that have hazardous or potentially hazardous conditions. Due to such undesirable exposure, harmful events, hazardous conditions of the environment 130 may require assistance of workers who may be required to wear proper PPE equipment appropriated for engaging in tasks, work sessions, activities, in such hazardous event to normalize the environment. For example, the hazardous event may present a heightened risk of fire or explosion and/or a potential exposure to caustic chemicals and substances, and any other environment prone or disposed to shock, leakage, blasts, impact, fire, explosion, chemical burns, contaminants conditions and all sorts of undesirable exposure to potentially harmful elements. As an example, worker 104 may be equipped with a PPE with several gears, such as a power-air purifying respirator (PAPR) to filter contaminants from the air in environments 130. The environment 130 may include contaminants that require a particulate filter in the PAPR. Also, the environment 130 may require contaminant filtration by using both an organic vapor filter and a particular filter in the PAPR.

In an embodiment, the environment 130 may be installed, integrated, mounted, and embedded with one or more sensors (not shown) to monitor, detect, and measure conditions of the environment 130, for example, normal conditions and/or hazard, and unusual conditions like hazardous events of the environment 130. In particular embodiments, the one or more sensors may include, but are not limited to, image sensors, a biometric sensor, a motion and orientation sensor, temperature sensors, and a location sensor. The image sensors, for example, cameras may be configured to capture images or live streams, real-world photographs, state, video stream of the environment 130. The image sensors may also include, but are not limited to, audio sensors or transducers, for example, omnidirectional or directional microphones. The audio sensors or transducers may detect sound from animate objects, for example, person or people in the ambient physical environment. The biometric sensor may include detecting bio-signals, for example, blood pressure, heart rate, body temperature, perspiration, or brain waves, identifying a person, including but not limited to, voice recognition, retinal recognition, facial recognition, fingerprint recognition, or electroencephalogram-based recognition, and so forth. The motion and orientation sensor may include an acceleration sensor, for example, an accelerometer, a gravity sensor, a rotation sensor like a gyroscope, and/or the like. The location sensor may include an orientation sensor component (e.g., a Global Positioning System (GPS) receiver), an altitude sensor (e.g., an altimeter or barometer that detects air pressure from which altitude may be derived), an orientation sensor component (e.g., a magnetometer), geolocation sensor or GPS sensors or wireless beacon to identify the location of the person or people or individual in a particular zone or region or space of the environment 130 and so forth. Additionally, the location sensors detect or measures the relative location or distance between the location sensor and the individual and determines whether the individual is indoors or outdoors based on the relative location or distance. The one or more sensors may also include, for one example, a lighting sensor, for example, a photometer, a temperature sensor, for example, one or more thermometers that detect ambient temperature, a humidity sensor, a pressure sensor like a barometer, acoustic sensor components one or more microphones that detect background noise, proximity sensor components infrared sensors that detect nearby objects, gas sensors e.g., gas detection sensors to detect concentrations of hazardous gases to ensure safety or to measure pollutants in the atmosphere, visibility, wind, or other sensors that may provide an indication, measurement, or signal corresponding to the surrounding environment 130. In another example, the temperature sensors may be a thermometer detecting temperature, humidity sensors for detecting humidity, a barometer detecting pressure, an accelerometer detecting movement or change in position, an air contaminant sensor for detecting potential harmful gases like carbon monoxide, or for detecting air-born contaminants or particulates such as smoke, soot, dust, mold, pesticides, solvents (e.g., isocyanates, ammonia, bleach, etc.), and volatile organic compounds (e.g., acetone, glycol ethers, benzene, methylene chloride, etc.). In particular embodiment, the one or more sensors may include gas sensors that may detect, for example any common gasses detected by a four-gas sensor, including: CO, $O_2$, HS and Low Exposure Limit. The one or more sensors may use radio waves to detect proximity of objects or a distance between objects. The one or more sensors may be a Bluetooth low energy (BLE) received signal strength indicator (RSSI) that uses RSSI of the BLE radio waves to infer whether people are close together. The one or more sensors in the environment 130 acts as a transmitter and a receiver and detects a like device that communicates using the BLE radio waves. The one or more sensors measures proximity to the like device, duration of the interaction, and amount of exposure of external hazards, using the RSSI of the BLE waves and identification of the other device based on information programmed in the BLE radio waves. Alternatively, the proximity sensor may be based on radio frequency identification (RFID), ultra-wideband (UWB), wireless fidelity (Wi-Fi), InfraRed, acoustic signaling, or other methods that enable detecting conditions and states of the environment 130. In some instances, the one or more sensors may determine the presence of a hazard when a contaminant level exceeds a designated hazard threshold. In some instances, the designated hazard threshold is configurable by the user or operator of the system 100. In some instances, the designated hazard threshold is stored in at least one of the one or more sensors, the equipment computing device 110 included in the monitoring device 102a, a primary gear of the safety equipment 102 (PPE), any of the one or more safety gears 106 (106a . . . 106n), any of the user devices 118, light emitting diode (LED) 120, RFID signal indicator 124, any of indicators for indicating visually, audially, texts, or any of types of notifications or alerts, and/or a personal data hub (not shown) associated with the system 100, a mobile device 102a, and the safety equipment 102 for detecting signals and assessments. It should be appreciated that only some of the sensors are illustrated, and some embodiments may comprise fewer or greater sensors and/or sub-sensor units, and the illustration should not be seen as limiting.

In particular embodiments, environment 130 includes a plurality of wireless access points (not shown) that may be geographically distributed throughout the environment 130 to provide support for wireless communications between the one or more sensors and the equipment computing device 110 linked to the safety equipment 102. In an embodiment, the data detected by the one or more sensors in the environment 130 may be considered as the environmental data 110a which may be transmitted in real-time dynamically and in a time interval to the monitoring device 102a, for example, the monitoring device 102a may include a mobile device 102a having the equipment computing device 110 and that implements the functionalities of the equipment computing device 110 via, for example, a mobile application.

In particular embodiments, the system 100 may include 'n' number of unlimited indicators which may be communicatively connected to the monitoring system 102a, (mobile device 102a) associated with the safety equipment 102 (PPE), via a data communication network 126. The data communication network 126 may include any suitable network. As an example and not by way of limitation, one or more portions of network 126 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), Internet or a portion of the Internet, a portion of the Public Switched Telephone Network (PSTN), Bluetooth, Bluetooth mesh, Radio Frequency Identification (RFID), Zigbee, Wireless Body Area Network (WBAN) and Near Field Technology (NFC), a cellular telephone network, or a combination of two or more of these. Network 126 may include one or more networks.

For example, FIG. 1 shows four indicators (118, 120, 122, and 124). The indicators may include a user device 118 which may be any electronic device, for example, without limitation, a desktop computer, laptop computer, tablet computer, mobile phone, notebook netbook, workstation, e-book reader, GPS device, camera, personal digital assistant (PDA), handheld electronic device, cellular telephone, smartphone, augmented/virtual reality device, personal computers (PCs), entertainment devices, set-top boxes, Televisions (TVs), smart watches, digital wristbands, portable computers such as ultra-books, all-in-one machines, internet TVs, display devices, home appliances, thermostat, digital cameras, interactive surfaces, 3D displays, IoT devices, IoT modules, media players or media systems, orientation-based devices; and Pico or embedded projectors, medical devices, medical display devices, vehicles, in-vehicle/air infotainment systems, unmanned aerial vehicles, unmanned vehicles, automated guided vehicles, flying vehicles, navigation systems, wearable devices, augmented reality enabled devices, wearable goggles, virtual reality devices, orientation-based devices, robots (robots), social robots, (humanoid) robots (android), interactive digital signage, digital kiosks, vending machines, other suitable electronic device, and combination thereof. In FIG. 1, the indicators may also include a light-emitting diode (LED) indicator 120, a speaker 122, and a RFID signal indicator 124. In an embodiment, the indicators (118, 120, 122, 124) may be configured to provide alert, warning, notification, report, descriptive information, and the like via visual on an interface (for example graphical user interface (GUI)), audio, haptic such as vibration, snooze, and the like, text alerts, RFID signals and the like. In an embodiment, the indicators (118, 120, 122, and 124) may be configured to provide alert, warning, notification, report, descriptive information relating to conditions of the environment 130 including the normal state, unusual state, harmful events, harsh events risky impactful and hazardous environment 130. For example, the indicators (118, 120, 122, and 124) may indicate a potential likelihood of a safety event is relatively high, that the environment is dangerous, and/or objects, systems, units, tools may be malfunctioning, that one or more components need to be repaired or replaced, or the like). In some instances, the indicators (118, 120, 122, 124) and the equipment computing device 110 (included in the mobile device 102a) may be associated with a computation engine (not shown) which may interpret alert data and issue one or more commands to the indicators (118, 120, 122, 124) to modify operation or enforce rules of the components, objects, systems, units, tools in order to bring operation in the environment 130 into compliance with desired/less risky behavior. For example, the computation engine may issue commands that control the gas leakage or a clean air supply source in the environment 130. In particular embodiments, each of the indicators (118, 120, 122, and 124) may be communicatively connected to the monitoring device 102a or the mobile device 102a embedded with the equipment computing device 110. Such a way of communication between the indicators (118, 120, 122, 124) and the monitoring device 102a enables each of the indicators (118, 120, 122, 124) to receive outputs corresponding to the verification of the one or more safety gears 106 and the PPE 102 from the mobile device 102a. For example, in particular embodiments, any of the indicators (118, 120, 122, and 124) including the monitoring device 102a (e.g., mobile device 102a) may provide indication, alert, warning, notification along with descriptive information or explanation relating to a predetermined safety gears along with their corresponding safety-related data applicable for the operation metrics, for example, task, work session, operation in the environment 130. The indication, alert or notification with the description information may relate to identification indicators including real-time operative information of the safety gears 106 (106a, . . . , 106n) of the safety equipment 102, one or more safety gears 106 that may be present in the PPE 102, the one or more safety gears 106 that may be missing from the PPE 102 for a particular operation metrics i.e. task, and the one or more safety components, along with their operative measures, the one or more safety gears 106 that may be malfunctioning and need correction in the functional/operation configuration, calibration and renewal and/or need replacement. In an embodiment, the indicators (118, 120, 122, 124) may also provide acknowledgment that the worker 104 may be equipped appropriately, for example, all the required safety gears 106 are present in the PPE 102. In an embodiment, the indicators (118, 120, 122, 124) may provide indications relating to which of the one or more safety gears 106 became the primary gear that implements the functionalities of verifying each of the other one or more safety gears 106, by communicating with each of the other one or more safety gears through any of Bluetooth, Bluetooth mesh, Radio Frequency Identification (RFID), Zigbee, Wireless Body Area Network (WBAN) and Near Field Technology (NFC) for acquiring the identification indicators including the real-time operative information from each of the other one or more safety gears 106 in the PPE 102. In an embodiment, the indicators (118, 120, 122, 124) also detect and indicate whether movements of each of the detected one or more safety gears 106 is according to a required movement or motion threshold by determining communication of motion sensors 128 associated with the one or more safety gears 106 and signal strength of each of the one or more safety gears 106 with the primary gear or the monitoring device 102a for verifying whether the one or more safety gears 106 are being worn. In an embodiment, the indicators (118, 120, 122, 124) may be enabled to indicate whether the one or more safety gears 106 are rated with safety gear configuration according to the particular operation metrics, and/or whether the worker 104 may be missing with the one or more safety gears 106 in the PPE 102 with appropriate rated safety gear configuration when equipment computing device 110 computes verification that acquired set of identification indicators including the real-time operative information of each of the one or more safety gears 106 are detected to be not similar to each of the predetermined safety gears and the safety-related data of each of the predetermined safety gears.

In particular embodiments, the indicators (118, 120, 122, 124) may be configured to indicate presence of other safety equipments (other PPEs) that are in communication with the equipment computing device 110 and/or that are proximate to the primary gear. In an embodiment, the indicators (118, 120, 122, 124) indicate status of the other safety equipments (other PPEs) by communicating with the mobile device 102*a* embedded with the equipment computing device 110 which may be linked to the primary gear. In an embodiment, the indicators (118, 120, 122, 124) indicate presence or absence of other safety gears in the other PPEs respectively by communicating with the mobile device 102*a*. In some embodiments, the indicators (118, 120, 122, 124) may be enabled to detect whether the other safety gears of the other PPEs are rated with safety gear configuration according to the particular operation metrics. The indicators (118, 120, 122, 124) may be enabled to detect whether the other safety gears are missing for operating according to the particular operation metrics of the environment and/or whether the worker 104 is missing the other safety gears with rated safety gear configuration in the other PPEs when the equipment computing device 110 computes verification that the acquired set of identification indicators including the real-time operative information of each of the other safety gears are detected to be not similar to each of the predetermined safety gears and the safety-related data of each of the predetermined safety gears. In an embodiment, the indicators (118, 120, 122, 124) indicates whether movements of each of the other safety gears in the other PPEs is according to a required movement or motion threshold by determining communication of motion sensors associated with those other safety gears and computing signal strength of each of the other safety gears with the primary gear or the monitoring device 102*a*. In such a way, the indicators indicate verification of the other safety gears that are being worn or not being worn in appropriate manner, position, or location in other PPEs.

In particular embodiments, the indicators (118, 120, 122, 124) may indicate factors relating to worker 104 wearing the safety equipment (PPE) 102 with required safety gears 106. For example, the factors may include, but are not limited to, impact on the worker 104 wearing the particular PPE, worker 104 comfort level, wear and tear of the safety gears 106, increased or decreased safety requirements of the environment 130 and impact of such changes in the safety requirements on the worker 104 that may enable indicating requirement of changes in the safety gears 106 or the PPE 102 configuring the PPE 102 applicable for the particular task in the hazardous environment 130. In an embodiment, the indicators (118, 120, 122, 124) may indicate predicting factors corresponding to prediction data of the hazards or harmful events in the environment 130 which in turn may enable determining the kinds of safety gears 106 required for the task or operation metrics in the hazardous environment. For example, the indicators (118, 120, 122, 124) may indicate a notification that PPE 102 should be worn, or the PPE 102 is inadequate to protect against the risk of airborne disease, such as whether the type of the PPE 102 is adequate to protect the wearer of the PPE from the risk or whether the PPE is effective or expired. Additionally, in some instances, the indicators (118, 120, 122, 124) may indicate not only whether the worker 104 is equipped appropriately but also whether the worker 104 is wearing the safety gears 106 appropriately in appropriate place and appropriate manner which will be explained later sections herein. In particular embodiments, the indicators (118, 120, 122, 124) may associated with the worker 104, staff member, administrator, supervisor, or management.

Referring to FIG. 1, in particular embodiments, the system 100 comprises the PPE 102 and/or PPE clothing integrated with the one or more safety gears 106 that may be different from one another. This PPE 102 may be determined to be wearable by the worker 104 for a work session in the hazardous environment 130. The PPE 102 may be associated with specific configuration and different unique PPE identifiers and requirements that makes the PPE 102 capable of being identified and employed according to the operation metrics detected from the environment 130. The unique identifier associated with the PPE 102 may be configured to specify PPE details including, but not limited to, a type of the PPE 102, a usage time of the PPE 102 over a particular time interval, a lifetime of the PPE 102, issues relating to connectivity of the PPE 102 and reasons of such issues, a usage history across multiple workers 104 of the PPE 102, contaminants, hazards, or other physical conditions detected by the PPE 102, expiration date of the PPE 102 and the like. The PPE details of the PPE 102 that have been under usage for different tasks and work sessions may be entered and stored in the log entries stored in the registry form and any other format and stored in a memory or storage space of the mobile device 102*a* which will be explained in detail in later sections herein.

In an embodiment, the PPE 102 comprises one or more safety gears 106. Some examples of the one or more safety gears 106 may include, but are not limited to, respiratory protection equipment (RPE), e.g., for normal condition use or emergency response; protective eyewear, such as visors, goggles, filters or shields; protective headwear, such as hard hats, hoods or helmets; hearing protection devices; protective shoes; protective gloves; other protective clothing, such as coveralls and aprons; protective articles, such as sensors, safety tools, detectors, global positioning devices, mining cap lamps and any other suitable gear. In some of the teachings, the safety components, gears or article further include, but are not limited to, powered air purifying respirators (PAPR), self-contained breathing apparatuses, fall protection harnesses, earmuffs, face shields, and welding masks, safety harnesses, lanyards, lifelines, fall arrestors, safety belts, other fall protection devices and equipment, gas detectors, self-contained breathing apparatuses, respirators, air/oxygen storage cylinders/tanks, facepieces, protective garments, protective gloves, eyewash stations, etc. In particular embodiments, each of the one or more safety gears 106 may be with specific configuration and each safety gear 106 may be calorie-rated to indicate how much energy from which product the worker 104. This configuration and calorie-rated characteristic enable the capabilities of the safety gears 106 of being employed toward the operation metrics detected from the environment 130 by the one or more sensors 128. As an example, FIG. 1 shows helmet 106*a*, goggles 106*b*, PPE pants 106*c*, protection boots 106*d*, earmuffs 106*e*, smoke filter 106*f*, jacket vest 106*g* and protection gloves 106*h* which may be appropriate for operation metrics like clearing up the fire hazard or smoke events in the environment 130 that may be under blast, explosion, or fire hazard event. In particular embodiments, each of the one or more safety gears 106 may be associated with different and unique identifier, for example, 108a, 108b, 108c . . . 108h. The different unique identifiers 108a, 108b, 108c . . . , 108h include, but are not limited to, unique tags, identifiers or labels or any kind of electronic tracking identifiers associated with each of the one or more safety gears 106 that allows automatic detection of the PPE safety gears 106 identification and configuration. Each unique identifier 108a, 108b, 108c . . . , 108h of the respective one or more safety gears 106a, 106b, 106c . . . 106h may be configured to specify a type of the gear of the article PPE 102, a usage time of the gear 106 including usage time of the corresponding PPE 102 over a particular time interval, a lifetime of the gear 106 and the PPE 102, issues relating to connectivity of the gears 106 within the PPE 102 and reasons of such issues, a usage history across multiple users of the PPE 102, contaminants, hazards, or other physical conditions detected by the PPE 102, expiration date of the PPE 102 and/or the gears 106 and the like. In particular embodiments, each of the one or more safety gears 106 define corresponding real-time operative information which includes, but not limited to, functional configuration and settings associated with ability of usage for the operation metrics in the hazardous environment 130, operative parameters that may match or mismatch with the safety-related data of the predetermined safety units and safety requirements of the environment 130. In an embodiment, the real-time operative information may also specify comfort level of the worker 104/wearer, strength and durability of the one or more safety gears 106, lifetime of the one or more safety gears 106, connectivity capacity with the one or more safety gears 106 and equipment computing device 110 and other proximal PPEs, their associated computing devices and gears, and other related operative information that may be counted against work session or operative metrics in the hazardous environment 130. In an embodiment, the details of each of the one or more safety gears 106 along with the corresponding real-time operative information applied for each task or work session may be entered and stored in the log entries stored in the registry form and any other format in a memory or storage space of the mobile device 102a which will be explained in detail in later section herein.

In particular embodiments, the safety equipment i.e., the PPE 102 comprises other sensors (not shown), such as heat detectors, thermal detector, skin conductance detectors to determine status of the PPE 102 including the comfort level of the worker 104 wearing the PPE 102. Additionally, in particular embodiments, the PPE 102 may comprise logics and heuristics to determine whether PPE 102 is configured with specific rated configuration. The logics and heuristics of the PPE 102 also determines rated safety gear configuration of each of the one or more safety gears 106 associated with certain characteristics. The other sensors of the PPE 102 also determine whether each safety gear 106 is being worn or positioned in the correct manner/position and whether each of the safety gears 106 are functioning properly in real-time. For example, the logics and heuristics may include, but are not limited to, motion sensors, orientation sensors, location sensors, position detectors, accelerometers, or gyroscopes. Such a way of using the motion sensors enable the detection of movements of each of the one or more safety gears 106. For example, if the worker 104 may be moving but the PPE 102 and/or gears 106 may not be moving, then it may be determined that the worker 104 probably may not be wearing the gears 106 in appropriate manner or the gears 106 may not be operational. In this scenario, the indication may be if worker 104 needs to be properly equipped. Another example, if lateral movements of each the safety gears 106 may be detected as compared to the movements of the worker 104, then it may be determined that the worker 104 may be wearing the safety gears 106 appropriately in correct manner.

In particular embodiments, the PPE 102 and each of the one or more safety gears 106 may be configured to communicatively connected with one another through a wireless network 109. Also, in some embodiments, the PPE 102 and each of the one or more safety gears 106 may be configured to communicatively connected with the equipment computing device 110 through the network 109. The network 109 may include, but not limited to, Bluetooth, Bluetooth mesh, RFID, Zigbee, WBAN and NFC. In particular, each of the one or more safety gears 106 may comprise components and/or I/O units that enables the wireless communication via the network 109.

In an embodiment, the system 100 comprises the equipment computing device 110 that installed in the monitoring device 102a as a mobile application. In an embodiment, the monitoring device 102a may be any of the electronic devices, that include but are not limited to, a desktop computer, laptop computer, tablet computer, mobile phone, notebook netbook, workstation, e-book reader, GPS device, camera, personal digital assistant (PDA), handheld electronic device, cellular telephone, smartphone, augmented/virtual reality device, personal computers (PCs), entertainment devices, set-top boxes, Televisions (TVs), smart watches, digital wristbands, portable computers such as ultra-books, all-in-one machines, internet TVs, display devices, home appliances, thermostat, digital cameras, interactive surfaces, 3D displays, IoT devices, IoT modules, media players or media systems, orientation-based devices; and Pico or embedded projectors, medical devices, medical display devices, vehicles, in-vehicle/air infotainment systems, unmanned aerial vehicles, unmanned vehicles, automated guided vehicles, flying vehicles, navigation systems, wearable devices, augmented reality enabled devices, wearable goggles, virtual reality devices, orientation-based devices, robots (robots), social robots, (humanoid) robots (android), interactive digital signage, digital kiosks, vending machines, other suitable electronic device, and combination thereof. For example, the monitoring device 102a may be a mobile device 102a and may comprise a mobile application to operate functionalities of the equipment computing device 110 for verifying the one or more safety gears 106. In an exemplary embodiment, the verification of the one or more safety gears 106 of the PPE 102 may be taking place in real-time dynamically through the mobile application when the worker 104 using the mobile device 102a may be present in and around the environment 130. In some embodiments, the monitoring device 102a (mobile device) may be used by the worker 104 who may be required to wear the PPE 102 (safety equipment) and/or PPE clothing integrated with the one or more safety gears 106. For example, the monitoring device 102a may be the mobile device 102a and may comprise a mobile application to verify the one or more safety gears 106 of the PPE 102. In an exemplary embodiment, the verification of the one or more safety gears 106 of the PPE 102 may be taking place in real-time dynamically through the mobile application when the worker 104 using the mobile device 102a may be present in and around the environment 130. An example of mobile application verifying the one or more safety gears 106 and safety equipment 102 may be explained in detail in reference to FIG. 5A and FIG. 5B in later sections herein.

In particular embodiments, the monitoring device 102a may be coupled to one or more sensors 128 such as heat detectors, thermal detector, skin conductance detectors to determine the comfort level of the worker 104 wearing the PPE 102. Additionally, in particular embodiments, the monitoring device 102a may comprise logics and heuristics to determine whether PPE 102 is configured with specific rated configuration. The logics and heuristics of the monitoring device 102a also determines whether each of the one or more safety gears 106 associated with particular rated safety gear configuration with certain characteristics. The one or more sensors 128 associated with the monitoring device 102a also determine whether each safety gear 106 is being worn or positioned in the correct manner/position and whether each of the safety gears 106 are functioning properly in real-time. For example, the logics and heuristics may include, but are not limited to, motion sensors, orientation sensors, location sensors, position detectors, accelerometers, or gyroscopes. Such a way of using the one or more sensors 128 enable the detection of movements of each of the one or more safety gears 106 with respect to the movements of the monitoring device 102a. This detection of movements of the one or more safety gears 106 may be achieved via determining the movements, for example, lateral movements of the one or more safety gears 106 and signal strength of communication of each of the one or more safety gears 106 with one another via the network 109 and with the monitoring device 102a either via the network 109 or the any data communication network 126. For example, consider the worker 104 may be moving but the PPE 102 and/or gears 106 may not be moving, then it may be determined that the worker 104 probably may not be wearing the gears 106 in appropriate manner or the gears 106 may not be operational. In this scenario, the indication may be if worker 104 needs to be properly equipped. Another example, if lateral movements of each the safety gears 106 may be detected as compared to the movements of the worker 104, then it may be determined that the worker 104 may be wearing the safety gears 106 appropriately in correct manner. In this scenario, the detection and indication may be that the worker 104 is wearing all the required safety gears 106 appropriately in correct manner and for the operation metrics in the environment 130. Also, in an embodiment, the monitoring device 102a being the mobile device 102a may act as one of the indicators and may be configured to implement the operations of the indicators explained in reference to examples 118, 120, 122, 124.

In some embodiments, the equipment computing device 110 may be installed or integrated in the environment 130 and performs operations of determining whether the worker 104 is equipped with appropriate PPE 102 with all the required one or more safety gears 106. The determination of the required one or more safety gears 106 represents that all the required one or more safety gears 106 are present in real-time for operating according to the operation metrics of the environment 130. In an embodiment, the equipment computing device 110 also determines whether the one or more safety gears 106 are missing or whether one or more safety gears need replacement and reconfiguration or whether the operative measures of the one or more safety gears need calibration and reconfiguration or whether the one or more safety gears are being worn in appropriate manner, for example, in correct orientation and position in the PPE 102. In an example, the presence or absence of the one or more safety gears 106 in the PPE 102 may also carried out by a camera installed in the environment 130 and that implements the operations of the equipment computing device 110.

In particular embodiments, the equipment computing device 110 may be the integrated electrical safety system (ESS) that may be configured to analyze the environmental data 110a, operation metrics, for example, tasks or work session required in the environment 130 under hazard, detecting the list of predetermined safety gears and the safety-related data of each of the predetermined safety gears and acquiring a set of identification indicators including real-time operative information from each of one or more safety gears 106 of the PPE 102. The equipment computing device 110 may be configured to locate itself to the monitoring device 102a that the equipment computing device 119 may in and around the environment 130 that requires the PPE 102 to be worn by the worker 104. Accordingly, the equipment computing device 110 determines the environmental data 110a from the harmful and hazardous environment 130. In an embodiment, the environmental data 110a may include contextual data, intensity-related data, and hazardous parameters associated with such environment 130. The contextual data may include, but is not limited to, the context of the environment 130 with which assistance of the workers 104 are appropriate and requiring the workers 104 to be equipped with set of safety gears 106 and PPE 102 appropriately according to the detected context. For example, contextual data may be related to context of the environment 130 exposed to events that may include, without limitation, blast, leakage of the chemical, electrical shock, fire, explosion, burns, contaminant situation or any harmful elements in a particular establishment, zone, area of the environment 130. In an embodiment, the contextual data may be related to a location of the environment 130, a boundary or perimeter of the environment 130, an area of the work environment 130, hazards detected or determined within and around the environment 130, and physical conditions of the environment 130. In an example, the contextual data may also include one or more features that are predicted based on captured and received environmental data of the environment 130. In an example, the prediction of the one or more features may include, but are not limited, impact and effect on the environment 130 due to hazardous event, prediction of an exposure of the environment 130 to any harmful elements due the hazardous events, one or more persons or people present in and around the environment 130, one or more persons related to assistance measures from the worker 104 that may be required for the one or more persons or people to relieve from the impact and conditions of environment 130, and other predictive measures required from the workers 104 for a particular condition and effect of the environment 130. In an embodiment, the intensity-related data of the environmental data 110a may include, but not limited to, level of events or hazards, for examples, extensive level of hazard, minimal level of hazard. For example, extensive level may be related to fire event in the environment 130 where a mask needs to be worn due to respiratory concerns, heat stress based on area or temperature. In an embodiment, the level of events may also include geographic regions of the environment 130 where unusual occurrence of unsafe event occurs, noise level which may be a condition that an area or the environment of interest causes the risk for workers 104 or users for noise induces hearing loss that may be determined from at least one of the one or more sensors 128. In this instance, the worker 104 wearing a noise dosimeter may send noise data to a data hub or the equipment computing device 110, for example, ESS 110 that may determine and detect the kinds of PPE 102 clothing required for such a work condition or task in the environment 130. In an embodiment, the hazardous parameters associated with the environment 130 may include, but are not limited to, risky, and unsafe conditions that are associated with the harmful events of any intensity, for example, blast, leakage of the chemical, electrical shock, fire, explosion, burns, contaminant situation or any harmful elements.

In an embodiment, the equipment computing device 110 determines operation metrics of the environment based on the environmental data 110a. For example, the equipment computing device 110 determines operation metrics, for example, tasks, work sessions, worksite, kinds of tasks, types of operations, protecting operations relating to providing protection to the people in the environment from fuses, dangerous emissions and particles and potential damages to the machinery and buildings influenced by environmental factors, or against emissions in the harsh and hazardous environment.

After determining the operation metrics of the environment 130, the equipment computing device 110 determines the list of predetermined safety gears along with safety-related data which may be applicable for the operation metrics. The predetermined safety gears may be standard gears for particular task or work session in the environment 130. The predetermined safety gears may be set as the standard gears upon examining the kinds of the environment 130, kinds of environmental data 110a, and worker's comfort parameters. The predetermined safety gears may be set as the standard gears which may be applicable to the task or work session of the environment 130 in most efficient way. The predetermined safety gears may be any of the one or more safety gears 106 configured with appropriate operative measures (except the ones that may be missing or incorrectly configured) and that may be used or utilized against the determined operation metrics i.e., work session or the task in the environment 130 in the recent event or past events. For example, in a scenario where the hazardous environment 130 may be exposed to gas leakage event. To protect against harmful contaminated air, the PPE 102 may be required to be equipped with helmet 106a, goggles 106b, PPE pants 106c, protection boots 106d, earmuffs 106e, smoke filter 106f, jacket vest 106g and protection gloves 106h which were the appropriate safety units, gears, and components for gas leakage event along with configuration information and functional parameters of each gear 106. Thus, helmet 106a, goggles 106b, PPE pants 106c, protection boots 106d, earmuffs 106e, smoke filter 106f, jacket vest 106g and protection gloves 106h which were the appropriate safety units, gears and components for gas leakage event may be considered as the list of predetermined safety gears.

In an embodiment, the equipment computing device 110 acquires the set of identification indicators including real-time operative information from each of one or more safety gears 106 of the PPE 102. For example, the equipment computing device 110 may receive identification indicators from the one or more safety gears 106 that may be present in real-time in the PPE 102. The equipment computing device 110 may receive identification indicators from the one or more safety gears 106 via tracking through the different unique identifiers 108 associated with each safety gear 106 currently present in the PPE 102. Also, the equipment computing device 110 acquires real-time operative information of each safety gear 106 currently present in the PPE 102. For example, identification indicator detected through the unique identifiers may correspond to specifying a type of the gear of the article PPE 102, a usage time of the gear 106 including usage time of the corresponding PPE 102 over a particular time interval, a lifetime of the gear 106, issues relating to connectivity of the gears 106 within the PPE 102 and reasons of such issues, a usage history across multiple users of the PPE 102, contaminants, hazards, or other physical conditions detected by the PPE 102, expiration date of the PPE 102 and/or the gears 106 and the like. Other real-time operative information includes, but not limited to, functional configuration and settings associated with ability of usage for the operation metrics in the hazardous environment 130, operative parameters that may match or mismatch with the safety-related data of the predetermined safety units and safety requirements of the environment 130. In an embodiment, the real time operative information acquired by the equipment computing device 110 may also specify comfort level of the worker 104/wearer, strength and durability of the one or more safety gears 106, lifetime of the one or more safety gears 106, connectivity capacity with the one or more safety gears 106 and equipment computing device 110 and other proximal PPEs, their associated computing devices and gears, and other related operative information that may be counted against work session or operative metrics in the hazardous environment 130.

In an embodiment, equipment computing device 110 may compare the set of identification indicators of the one or more safety gears 106 currently present in the PPE 102 with the list of predetermined safety gears along with comparing the real-time operative information of the one or more safety gears 106 with the safety-related data of each of the predetermined safety gears to detect and indicate that the one or more safety gears 106 along with one or more operative measures are present in the PPE 102 and may be appropriate accordingly to the operation metrics of the environment 130. In an embodiment, the comparison of the set of identification indicators of the one or more safety gears 106 currently present in the PPE 102 with the list of predetermined safety gears along with comparison of the real-time operative information of the one or more safety gears 106 with the safety-related data of each of the predetermined safety gears to detect and indicate that the one or more safety gears 106 may be missing from the PPE 102 for a particular operation metrics i.e. task, and the one or more safety components. The equipment computing device 110 may detect and indicate such presence or absence of the one or more safety gears 106 along with their operative measures, the one or more safety gears 106 that may be malfunctioning and need correction in the functional/operation configuration, calibration, and renewal and/or need replacement, need reconfiguration, installation etc. For example, the equipment computing device 110 implemented as the mobile application in the mobile device 102a may detect and indicate on the mobile phone 102a that the earmuffs 106e may be missing in the PPE 102 when compared to the list of predetermined safety gears which recommend and indicate that earmuffs 106e are required as mandatory to operate under gas leakage environment 130. As one more example, the mobile application may detect and indicate that jacket vest 106g may be torn out and may cause discomfort to the worker 104 when performing the task when compared to the predetermined jacket configuration in the list of predetermined safety gears. As another example, the equipment computing device 110 may detect and indicate that worker 104 may be wearing the PPE pants 106c inappropriately i.e., in an improper way when compared to the orientation condition set for the predetermined PPE pants in the safety gears.

In an embodiment, the equipment computing device 110 may assign any of the one or more safety gears 106 as the primary gear for acquiring the set of identification indicators including real-time operative information from each of the other one or more safety gears 106 of the PPE 102. The primary gear communicates with each of the other one or more safety gears 106 through any of network 109, for example, Bluetooth, Bluetooth mesh, Radio Frequency Identification (RFID), Zigbee, Wireless Body Area Network (WBAN) and Near Field Technology (NFC). Through the way of network 109 communication, the primary gear acquires the identification indicators including the real-time operative information from each of the other one or more safety gears 106 in the PPE 102.

In an embodiment, the equipment computing device 110 may be configured to determine whether the one or more safety gears 106 are rated with safety gear configuration according to the particular operation metrics, and/or whether the worker 104 may be missing with the one or more safety gears 106 in the PPE 102 with appropriate rated safety gear configuration when equipment computing device 110 computes verification that acquired set of identification indicators including the real-time operative information of each of the one or more safety gears 106 are detected to be not similar to each of the predetermined safety gears and the safety-related data of each of the predetermined safety gears.

In an embodiment, the equipment computing device 110 may be configured to detect the movements of each of the one or more safety gears 106 via the motion sensors 128 associated with the one or more safety gears 106 and determine whether the movements are according to a required movement or motion threshold. The equipment computing device 110 determines signal strength of each of the one or more safety gears 106 with another for communicating with one another through the network 109 and with the monitoring device 102a via the primary gear. From the movements and signal strength of each of the one or more safety gears 106, the equipment computing device 110 verifies whether the one or more safety gears 106 are being worn.

In particular embodiments, the equipment computing device 110 may utilize the primary gear to detect presence of other safety equipments (other PPEs) that are proximate to the primary gear. In an embodiment, the equipment computing device 110 may determine status of the other safety equipments (other PPEs). In an embodiment, the equipment computing device 110 may detect and determine the presence or absence of other safety gears in the other PPEs respectively by communicating with the primary gear. In some embodiments, the equipment computing device 110 may be enabled to detect whether the other safety gears of the other PPEs are rated with safety gear configuration according to the particular operation metrics. The equipment computing device 110 may be enabled to detect whether the other safety gears are missing for operating according to the particular operation metrics of the environment and/or whether the worker 104 is missing the other safety gears with rated safety gear configuration in the other PPEs when the equipment computing device 110 computes verification that the acquired set of identification indicators including the real-time operative information of each of the other safety gears are detected to be not similar to each of the predetermined safety gears and the safety-related data of each of the predetermined safety gears. In an embodiment, the equipment computing device 110 may determine the movements of each of the other safety gears in the other PPEs and whether such movements are according to the required movement or motion threshold via the motion sensors associated with those other safety gears. The equipment computing device 110 computes signal strength of each of the other safety gears for communication with the primary gear. In such a way, the equipment computing device 110 may detect and indicate whether the other safety gears are being worn by the worker 104 whether the other safety gears are not being worn in appropriate manner, position, or location in other PPEs.

In an embodiment, the equipment computing device 110 comprises a prediction analysis engine 112 that carries out predicting impact and effect on the environment 130 due to hazardous event, prediction of an exposure of the environment 130 to any harmful elements due the hazardous events, one or more persons or people present in and around the environment 130, one or more persons related to assistance measures from the worker 104 that may be required for the one or more persons or people to relieve from the impact and conditions of environment 130, predicting impact of hazardous event on the one or more person so that relative safety measures may be predicted and other predictive measures required from the workers 104 for a particular condition and effect of the environment 130. In an embodiment, the prediction analysis engine 112 predicts wear and tear of the one or more safety gears 106, operative information of each of the one or more safety gears 106, real-time functional parameters corresponding to predicting whether the one or more safety gears 106 are effectively functional in real-time dynamically for the particular task or work session, predicting whether one or more safety gears 106 may be causing discomfort to the worker 104 in carrying out the operation in the hazardous environment 130, predicting changes or configuration/reconfiguration of the one or more safety gears 106, the components 106 corresponding to the predicted scenario in the environment 130 so that the worker 104 is equipped appropriately, predicting intensity-related data 110b whether environment 130 may be undergoing increased or decreased safety-related measures, predicting whether the worker 104 may be wearing the one or more safety gears 106 incorrectly or inappropriate manner, position or direction, predicting whether the required one or more safety gears 106 are communicating appropriately/inappropriately with the primary gear (206a/206g in FIGS. 2A and 2b).

In an embodiment, the equipment computing device 110 comprises one or more memory units, data repositories or a memory 114 that stores computer-executable instructions. In exemplary embodiments, the equipment computing device 110 may comprise one or more processors which may be programmed to implement the computer-executable instructions stored in the memory 114. The one or more processors implements each functionality of the equipment computing device 110 for detecting and indicating whether one or more safety gears 106 may be missing, whether the one or more safety gears 106 are being present and worn by the worker 104, whether the one or more safety gears 106 need reconfiguration, installation etc. In an embodiment, the one or more processors may be configured to detect and determine whether the one or more safety gears 106 are being worn appropriately in a correct location and manner by the worker 104 for the desired work session or task corresponding to the detected operation metrics of the hazardous environment 130. In an embodiment, the one or more processors may be configured to detect presence of other safety gears that may be at proximate with respect to the primary gear. For example, in FIG. 2A and FIG. 2B, primary gear 206a/206g may be utilized to determine status of each of the one or more safety gears 106 and status of other safety gears or components and verifying whether the worker 104 and other workers are equipped with appropriate safety gears and whether other workers are wearing the safety gears appropriately in correct manner.

In an embodiment, the equipment computing device 110 comprises one or more data registers 116 that may store one or more log information corresponding to the one or more safety gears 106, safety components which are required and used in the PPE equipment 102 for the recent and past operation metrics in the environment 130. For example, for protecting the worker 104 in poisonous gas leakage in a room, the worker 104 may be required to wear smoke filter 106f as mandatory. The registry 116 stores information relating to the PPE equipment 102 that is being worn at a particular type of hazardous environment 130 which was exposed to harmful event, one or more safety 106, for example, helmet 106a, goggles 106b, PPE pants 106c, protection boots 106d, earmuffs 106e, smoke filter 106f, jacket vest 106g and protection gloves 106h were the appropriate gears and components for gas leakage event along with configuration information and functional parameters of each gear 106. The log information storing the usage report of the PPE equipment 102 and usage of appropriate safety gears 106 for the task or work session in the hazardous environment 130 is described in later sections herein.

Figure 4:
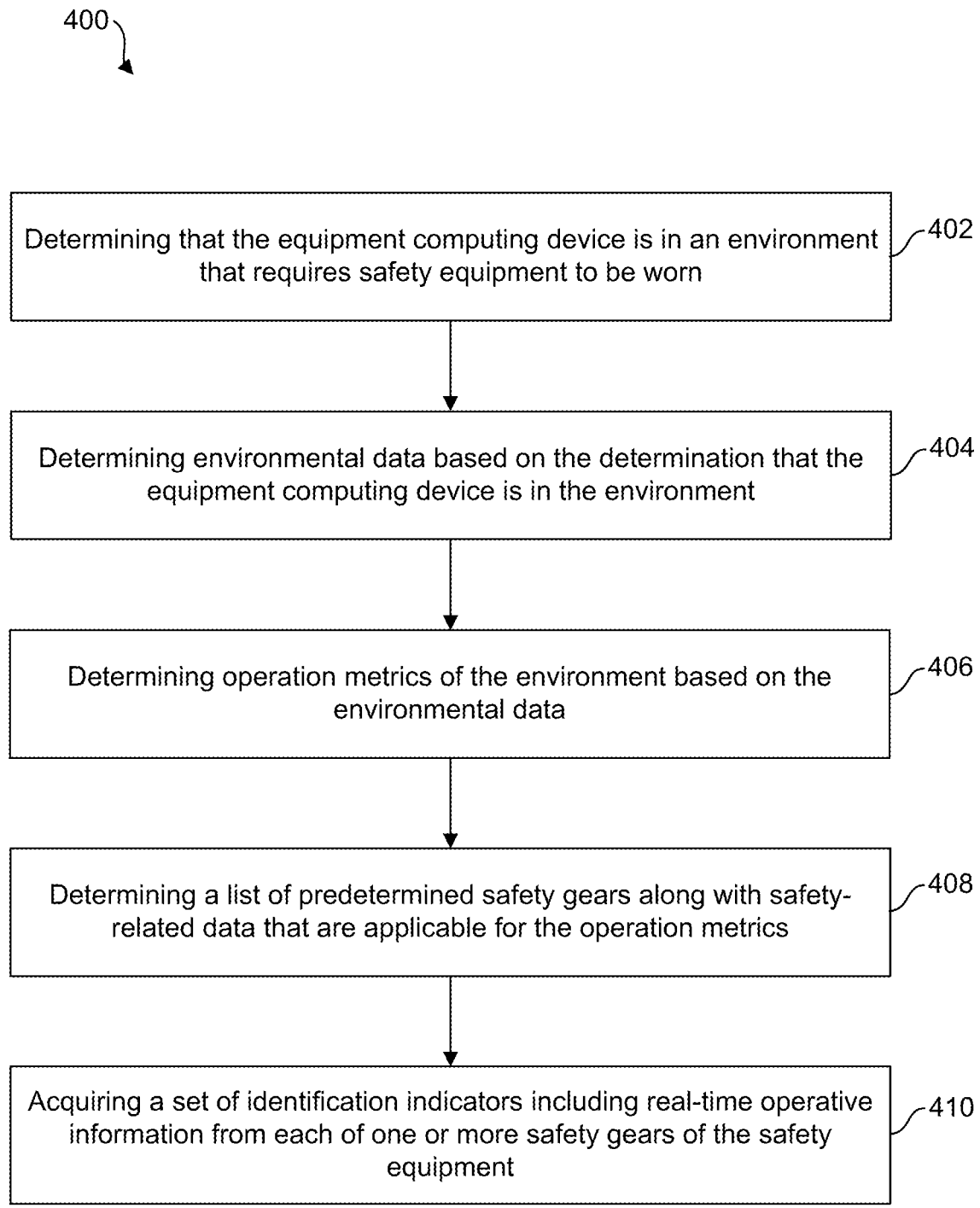
FIG. 4 depicts an example flowchart for safety equipment and safety gears according to an embodiment.

Now referring to FIG. 4 which depicts an example flowchart 400 for safety equipment 102 and safety gears 106 according to an embodiment.

The method may begin at step 402, where an equipment computing device (denoted by 110 in FIG. 1) may be the integrated electrical safety system (ESS) and may be associated with safety equipment, for example, PPE 102 and the one or more sensors 128. At step 402, the equipment computing device 110 may locate itself in and around the environment 130 that requires the PPE 102 to be worn by the worker 104. In particular, the monitoring device 102a may determine whether the equipment computing device 110 is in an environment that requires PPE 102 to be worn by the worker 104.

At step 404, the method determines the environmental data 110a from the harmful and hazardous environment 130. In an embodiment, the environmental data 110a may include contextual data, intensity-related data, and hazardous parameters associated with such environment 130.

At step 406, the process determines operation metrics of the environment based on the environmental data 110a. For example, the equipment computing device 110 determines operation metrics, for example, tasks, work sessions, worksite, kinds of tasks, types of operations, protecting operations relating to providing protection to the people in the environment from fuses, dangerous emissions and particles and potential damages to the machinery and buildings influenced by environmental factors, or against emissions in the harsh and dangerous environment.

At step 408, after determining the operation metrics of the environment 130, the process determines the list of predetermined safety gears along with safety-related data which may be applicable for the operation metrics. The predetermined safety gears may be standard gears for particular task or work session in the environment 130. The predetermined safety gears may be set as the standard gears upon examining the kinds of the environment 130, kinds of environmental data 110a, and worker's comfort parameters. The predetermined safety gears may be set as the standard gears which may be applicable to the task or work session of the environment 130 in most efficient way. The predetermined safety gears may be any of the one or more safety gears 106 configured with appropriate operative measures (except the ones that may be missing or incorrectly configured) and that may be used or utilized against the determined operation metrics i.e., work session or the task in the environment 130 in the recent event or past events. For example, in a scenario where the hazardous environment 130 may be exposed to gas leakage event. To protect against harmful contaminated air, the PPE 102 may be required to be equipped with helmet 106a, goggles 106b, PPE pants 106c, protection boots 106d, earmuffs 106e, smoke filter 106f, jacket vest 106g and protection gloves 106h which were the appropriate safety units, gears, and components for gas leakage event along with configuration information and functional parameters of each gear 106. Thus, helmet 106a, goggles 106b, PPE pants 106c, protection boots 106d, earmuffs 106e, smoke filter 106f, jacket vest 106g and protection gloves 106h which were the appropriate safety units, gears and components for gas leakage event may be considered as the list of predetermined safety gears.

At step 410, the process acquires the set of identification indicators including real-time operative information from each of one or more safety gears 106 of the PPE 102 via communicating through network 109 including, but not limited to, Bluetooth, Bluetooth mesh, Radio Frequency Identification (RFID), Zigbee, Wireless Body Area Network (WBAN) and Near Field Technology (NFC). For example, the process receives identification indicators from the one or more safety gears 106 that may be present in real-time in the PPE 102. The process receives identification indicators from the one or more safety gears 106 via tracking through the different unique identifiers 108 associated with each safety gear 106 currently present in the PPE 102. Also, the process acquires real-time operative information of each safety gear 106 currently present in the PPE 102. For example, identification indicator detected through the unique identifiers may correspond to specifying a type of the gear of the article PPE 102, a usage time of the gear 106 including usage time of the corresponding PPE 102 over a particular time interval, a lifetime of the gear 106, issues relating to connectivity of the gears 106 within the PPE 102 and reasons of such issues, a usage history across multiple users of the PPE 102, contaminants, hazards, or other physical conditions detected by the PPE 102, expiration date of the PPE 102 and/or the gears 106 and the like. Other real-time operative information includes, but not limited to, functional configuration and settings associated with ability of usage for the operation metrics in the hazardous environment 130, operative parameters that may match or mismatch with the safety-related data of the predetermined safety units and safety requirements of the environment 130. In an embodiment, the real time operative information acquired by the equipment computing device 110 may also specify comfort level of the worker 104/wearer, strength and durability of the one or more safety gears 106, lifetime of the one or more safety gears 106, connectivity capacity with the one or more safety gears 106 and equipment computing device 110 and other proximal PPEs, their associated computing devices and gears, and other related operative information that may be counted against work session or operative metrics in the hazardous environment 130.

In an embodiment, the process step 410 may further include assigning any of the one or more safety gears 106 as the primary gear for acquiring the set of identification indicators including real-time operative information from each of the other one or more safety gears 106 of the PPE 102. The primary gear communicates with each of the other one or more safety gears 106 through any of network 109, for example, Bluetooth, Bluetooth mesh, Radio Frequency Identification (RFID), Zigbee, Wireless Body Area Network (WBAN) and Near Field Technology (NFC). Through the way of network 109 communication, the primary gear acquires the identification indicators including the real-time operative information from each of the other one or more safety gears 106 in the PPE 102.

At step 412, process compares the set of identification indicators of the one or more safety gears 106 currently present in the PPE 102 with the list of predetermined safety gears along with comparing the real-time operative information of the one or more safety gears 106 with the safety-related data of each of the predetermined safety gears to detect and indicate that the one or more safety gears 106 along with one or more operative measures are present in the PPE 102 and may be appropriate accordingly to the operation metrics of the environment 130. In an embodiment, the comparison of the set of identification indicators of the one or more safety gears 106 currently present in the PPE 102 with the list of predetermined safety gears along with comparison of the real-time operative information of the one or more safety gears 106 with the safety-related data of each of the predetermined safety gears to detect and indicate that the one or more safety gears 106 may be missing from the PPE 102 for a particular operation metrics i.e. task, and the one or more safety components. The process may detect and indicate such presence or absence of the one or more safety gears 106 along with their operative measures, the one or more safety gears 106 that may be malfunctioning and need correction in the functional/operation configuration, calibration, and renewal and/or need replacement, need reconfiguration, installation etc. For example, the process implemented by the mobile device 102a may detect and indicate on the mobile phone 102a that the earmuffs 106e may be missing in the PPE 102 when compared to the list of predetermined safety gears which recommend and indicate that earmuffs 106e are required as mandatory to operate under gas leakage environment 130. As one more example, the mobile application may detect and indicate that jacket vest 106g may be torn out and may cause discomfort to the worker 104 when performing the task when compared to the predetermined jacket configuration in the list of predetermined safety gears. As another example, the process may detect and indicate that worker 104 may be wearing the PPE pants 106c inappropriately i.e., in an improper way when compared to the orientation condition set for the predetermined PPE pants in the safety gears.

In an embodiment, process 400 may further determine the rated safety gear configuration of each of the one or more safety gears 106 and verify whether the detected rated safety gear configuration of each safety gear 106 is according to the particular operation metrics. From comparison step 412, the one or more safety gears 106 that may be missing in the PPE 102 with appropriate rated safety gear configuration. In particular, the process step 412 detects that the acquired set of identification indicators including the real-time operative information of each of the one or more safety gears 106 to be not similar to each of the predetermined safety gears and the safety-related data of each of the predetermined safety gears. In such a way, the process step 412 may determine the rated safety gear configuration of each of the one or more safety gears 106. In an embodiment, the rated safety gear configuration of each of the one or more safety gears 106 may be determined based on receiving data relating to each of the one or more safety gears 106 via the primary gear.

In an embodiment, the process 400 may further include detecting the movements of each of the one or more safety gears 106 via the motion sensors 128 associated with the one or more safety gears 106 and determine whether the movements are according to a required movement or motion threshold. Further, the process 400 may utilize the primary gear to determine signal strength of each of the one or more safety gears 106 with another for communicating with one another through the network 109 and with the monitoring device 102a. From the movements and signal strength of each of the one or more safety gears 106, the process step 412 may verify whether the one or more safety gears 106 are being worn.

In particular embodiments, the process 400 may further perform detecting presence of other safety equipments (other PPEs) that are proximate to the primary gear. In an embodiment, the process 400 may determine status of the other safety equipments (other PPEs) via the primary gear. In an embodiment, the primary gear may detect and determine the presence or absence of other safety gears in the other PPEs respectively by communicating through the network 109. Detection of status of each of the safety gears, the process 400 may detect whether the other safety gears of the other PPEs are rated with safety gear configuration according to the particular operation metrics. In similar way, the process 400 may be enabled to detect whether the other safety gears are missing for operating according to the particular operation metrics of the environment and/or whether the worker 104 is missing the other safety gears with rated safety gear configuration in the other PPEs when the equipment computing device 110 at step 412, computes verification that the acquired set of identification indicators including the real-time operative information of each of the other safety gears are detected to be not similar to each of the predetermined safety gears and the safety-related data of each of the predetermined safety gears. In an embodiment, via the primary gear, the process 400 may determine the movements of each of the other safety gears in the other PPEs and whether such movements are according to the required movement or motion threshold via the motion sensors associated with those other safety gears. Also, process computes signal strength of each of the other safety gears for communication with the primary gear. In such a way, the process 400 includes detecting and indicating whether the other safety gears are being worn by the worker 104 whether the other safety gears are not being worn in appropriate manner, position, or location in other PPEs.

In an embodiment, the detection and indication, of whether PPE 102 may be appropriately equipped, or under-equipment or fault in operation of any of the safety gears 106 which may not protect the workers 104 appropriately from hazard prone environment 130, may be provided as alert, warning, notification along with descriptive information or explanation relating correcting the PPE 102 configuration and gear configuration. The indication may be provided via any of visual interface, audio interface, tactile interface, text, video interface, vibration, speakers, vibration devices, light emitting diodes (LEDs), buzzers or other outputting alerts, audio messages, and radio-frequency signals. For example, the indication may be provided via the computer device 118, LED indicators 120, speaker 122 and RFID signal indicator 124. In an embodiment, the operative measures may be indicated for correcting malfunctioning and operational configuration, calibration, and renewal of the one or more safety gears and components 106. The method may use the indicators (118, 120, 122, 124) to indicate factors relating to worker 104 including, but not limited to, impact on the worker 104 wearing the particular PPE, worker 104 comfort level, wear and tear of the safety gears or components 106, increased or decreased safety requirements of the environment 130 and impact of such changes in the safety requirements on the worker 104 that may enable indicating requirement of changes in the safety gears 106 or the PPE 102 configuring the PPE 102 applicable for the particular task in the hazardous environment 130. In an embodiment, the method may use the indicators (118, 120, 122, 124) to indicate predicting factors corresponding to prediction data of the hazards or harmful events in the environment 130 which in turn may enable determining the kinds of safety gears 106 required for the task or operation metrics in the hazardous environment. For example, the indicators 118, 120 may indicate a notification that PPE 102 should be worn, or the PPE 102 is inadequate to protect against the risk of airborne disease, such as whether the type of the PPE 102 is adequate to protect the wearer of the PPE from the risk or whether the PPE is effective or expired. Additionally, in some instances, the indicators may indicate not only whether the worker 104 is equipped appropriately but also whether the worker 104 is wearing the safety gears 106 appropriately in appropriate place and appropriate manner.

In an embodiment, the process 400 stores one or more log information corresponding to the one or more safety gears 106, safety components which were used in the PPE equipment 102 for the recent and past operation metrics in the environment 130. For example, for protecting the worker 104 in poisonous gas leakage in a room, the worker 104 may be required to wear smoke filter 106f as mandatory. The registry 116 stores information relating to the PPE equipment 102 that is being worn at a particular type of hazardous environment 130 which was exposed to harmful event, one or more safety 106, for example, helmet 106a, goggles 106b, PPE pants 106c, protection boots 106d, earmuffs 106e, smoke filter 106f, jacket vest 106g and protection gloves 106h were the appropriate gears and components for gas leakage event along with configuration information and functional parameters of each gear 106. The log information stores the usage report of the PPE equipment 102, lifespan of the safety gears, configuration information of each safety gear, features relating to each of the safety gears, and usage of appropriate safety gears 106 utilized for the task or work session in the hazardous environment 130. In an embodiment, the stored information may be assigned as the predetermined safety units for next work session and may be updated as per operation metrics of the environment 130.

Figure 2A:
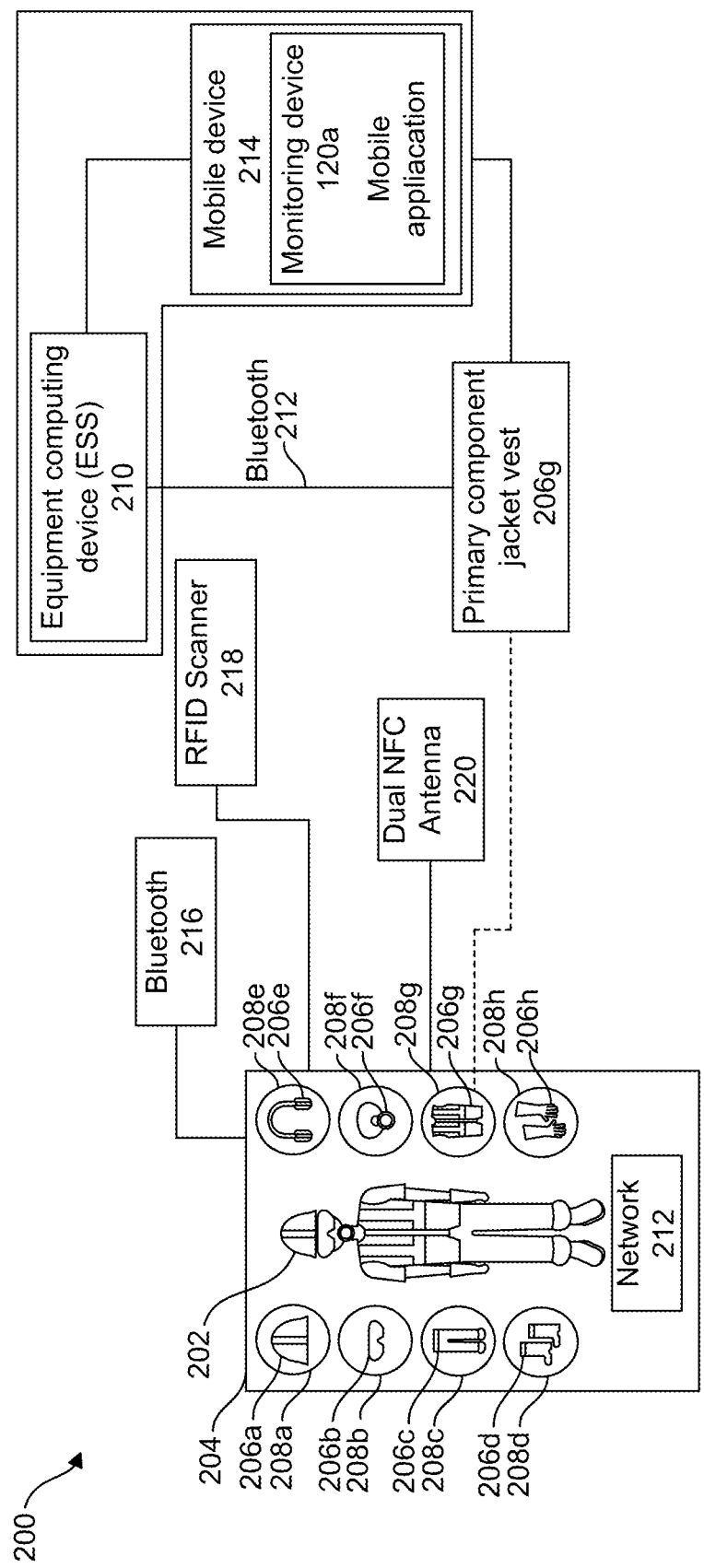

FIG. 2A and FIG. 2B illustrate an example of assigning one of the one or more safety gears 206 as a primary gear/component to receive and verify the presence or absence of the one or more safety gears 206 in the PPE 102. Referring to FIG. 2A and FIG. 2B, one safety gear, for example, jacket vest 206g among a set of the one or more safety gears 206 integrated with the PPE 204 may assigned as the primary gear to communicate with other safety gears 206 and the equipment computing device 210 wirelessly through the wireless network 212 (109). The safety gear 206g may be assigned as the primary gear by the equipment computing device 210 and/or by the monitoring device 214 and/or manually by the worker 202 or administrator or any supervisor. The safety gear 206g among the one or more safety gears 106 may be assigned as the primary gear during installation, or in real-time dynamically based on configuration, connectivity ability and functional characteristics associated with the safety gear and based on the type of task needed in the hazardous environment 130. In an embodiment, there may be any number of primary gears in any of the PPEs and may be assigned with priority as being utilized as the primary components. Each of the one or more safety gears 206 communicate with the primary component 206g through Bluetooth, Bluetooth mesh, Radio Frequency Identification (RFID), Zigbee, Wireless Body Area Network (WBAN) and Near Field Technology (NFC).

As an example, in the network 212 with Bluetooth connection 216, each of the one or more safety gears 106 may be embedded with Bluetooth tags with onboard storage to identify itself. The jacket vest 206g among the other one or more safety gears 206 of PPE 204 may be assigned automatically or manually as the primary component to communicate wirelessly with the equipment computing device 210 which may be an integrated electrical safety system (ESS) monitoring which may comprise the list of predetermined components or safety units to check whether certain safety gears or components in the PPE 204 may be present or not for work hazard, for example, electrical hazard. The jacket vest 206g assesses the PPE 204 and each of the one or more safety gears 206. Each of the one or more safety gears 206 communicates with the primary component i.e., jacket vest 206g through the Bluetooth connection 216. In this way, all the one or more safety gears 206 may be monitored by the jacket vest 206g reducing or avoiding the consumption of the available simultaneous Bluetooth connections enabled by the other one or more safety gears 206. The jacket vest 206g being the primary component interacts with the user device 214 which may be the monitoring device 102a and comprises a mobile application to provide indication based on comparison of the safety gears 206 with the list of predetermined safety units.

As another example, in the network 212 with RFID connection 218, each of the one or more safety gears 206 in the set of safety gears 206 may be equipped with a RFID tag, which may be easily read by a scanner associated with the PPE 204 or the user device 214 which may be the monitoring device 102a and/or the equipment computing device 210 or any combination thereof. In one example, this RFID tag may be detected by a scanner, camera or image sensor integrated in the PPE 204, installed with the user device 214 and/or the environment 130 itself. The scanner may be programmed with each of the different sets of the PPE safety gears needed based on the safety requirements, operative metrics and/or environment 130 requirement. Each RFID tag may communicate with the ESS/equipment computing device 210 to detect and indicate whether all components of the PPE 204 set are present for given work hazard.

As another example, in the network 212 with NFC connection 220, each of the one or more safety gears 206 in the set of safety gears 206 may be equipped with RFID tags 208. One of the one or more safety gears 206, for example, in FIG. 2B, a headgear 206a among the set of the one or more safety gears 206 may be assigned as the main/primary gear with which each RFID tag may communicate. The main component i.e., the headgear 206a may comprise a dual antenna component. First antenna operates in the near-field range and/or RFID. Second antenna may be an UHF RFID and/or NFC which communicates with the first antenna to detect presence of the other RFID tags 208 in the PPE set 204 via NFC scanner. Additionally, such dual antenna components or units of the set of the one or more safety gears 106 may act as an access point for all the RFID components or RFID enabled safety gears of the PPE 204 to connect with one another.

Figure 3:
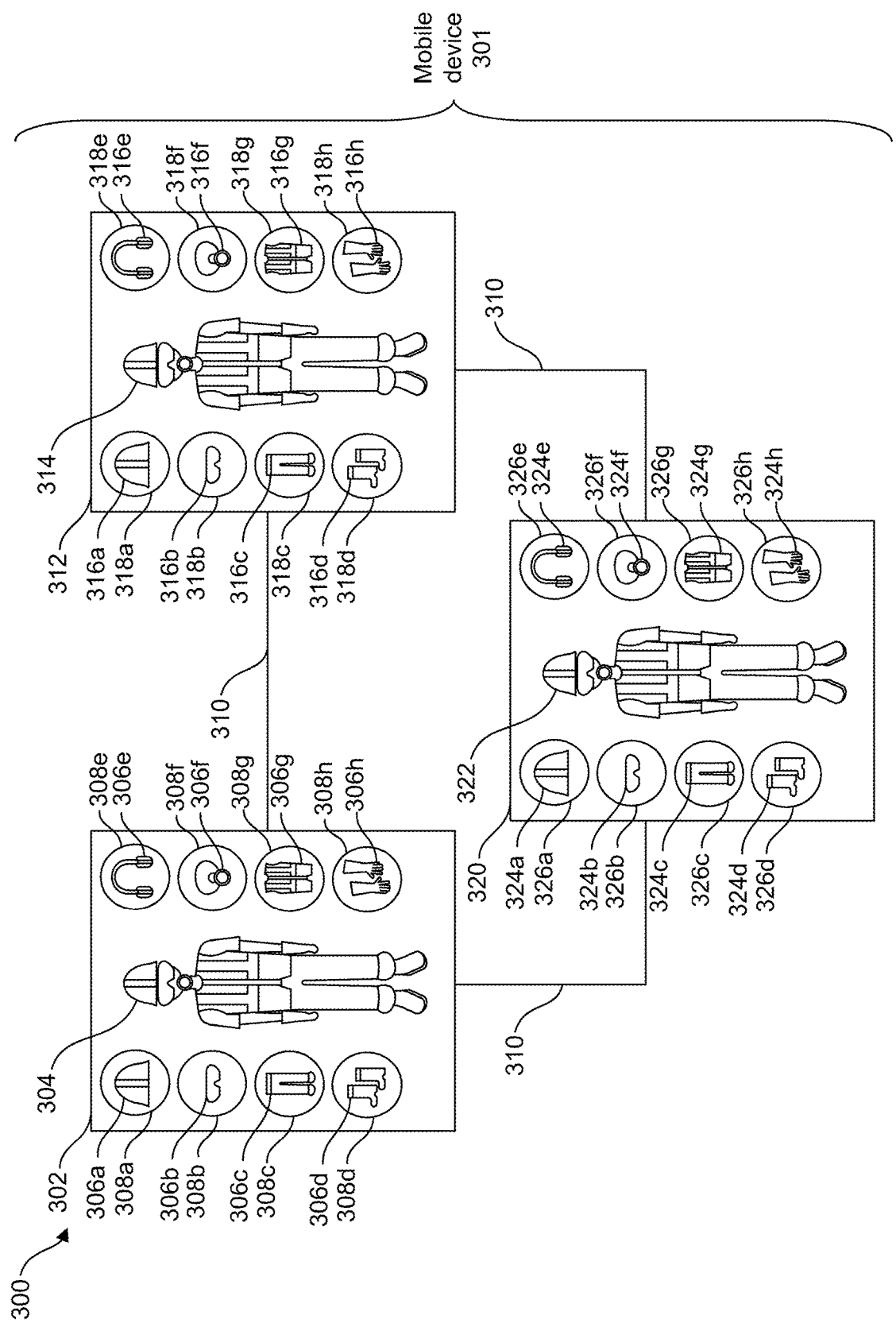
FIG. 3 illustrates an example of communication with different safety equipment and associated safety gears according to an embodiment of the present disclosure.

FIG. 3 illustrates an example of communication with different PPEs and associated safety gears according to an embodiment of the present disclosure. Considering the jacket vest 306g with identification indicator 308g as the primary gear assigned according to the FIG. 2A and FIG. 2B. The jacket vest 306g of PPE 302 may be configured to other PPEs, for example, 312 and 320 which may present at proximate to the PPE 302. In particular, the primary component jacket vest 306g may be configured to utilize any of the Bluetooth, Bluetooth mesh, Radio Frequency Identification (RFID), Zigbee, Wireless Body Area Network (WBAN) and Near Field Technology (NFC) network and corresponding RFID scanner and dual NFC antenna for tracking and detecting the other PPEs 312 and 320 present in the proximal range with respect to the primary PPE 302. In an embodiment, the primary component jacket vest 306g may be enabled to track the other PPE 312 and their associated safety gears 316 of PPE 312 by detecting the corresponding identification indicators 318 corresponding to safety gears 316 which may be at short range distance from PPE 302. Similarly, the primary gear jacket vest 306g may be enabled to track the other PPE 320 along with their associated safety gears 324 of PPE 320 by detecting the corresponding identification indicators 326 through short range distance from PPE 302. In this way, the primary gear jacket vest 302 may be enabled to not only determine status of each of the one or more safety gears 306 of the PPE 302 but also status of other safety gears or components 316 and 324 of PPE 312 and 320 respectively. The primary gear jacket vest 306g may further verify whether the each of the worker 304 wearing PPE 302, worker 314 wearing PPE 312 and worker 322 wearing PPE 320 are equipped with appropriate safety gears and component and whether each of the one or more safety gears 306, 316 and 324 are equipped and worn appropriately. For example, the PPE 320 worn by the worker 322 may be missing gloves 326 as the primary component jacket vest 306g may not track and detect the gloves 326. Thus, the primary gear jacket vest 306g may provide indication to the worker 322, or the supervisor or may display such indication on the any of the indicators and/or mobile application. As another example, if the earmuffs 316e in PPE 312 may be worn incorrectly or may be non-functional towards operation metrics of the hazardous environment, the primary component jacket vest 306g may indicate such alert along with explanation of correcting the malfunction.

Figure 5A:
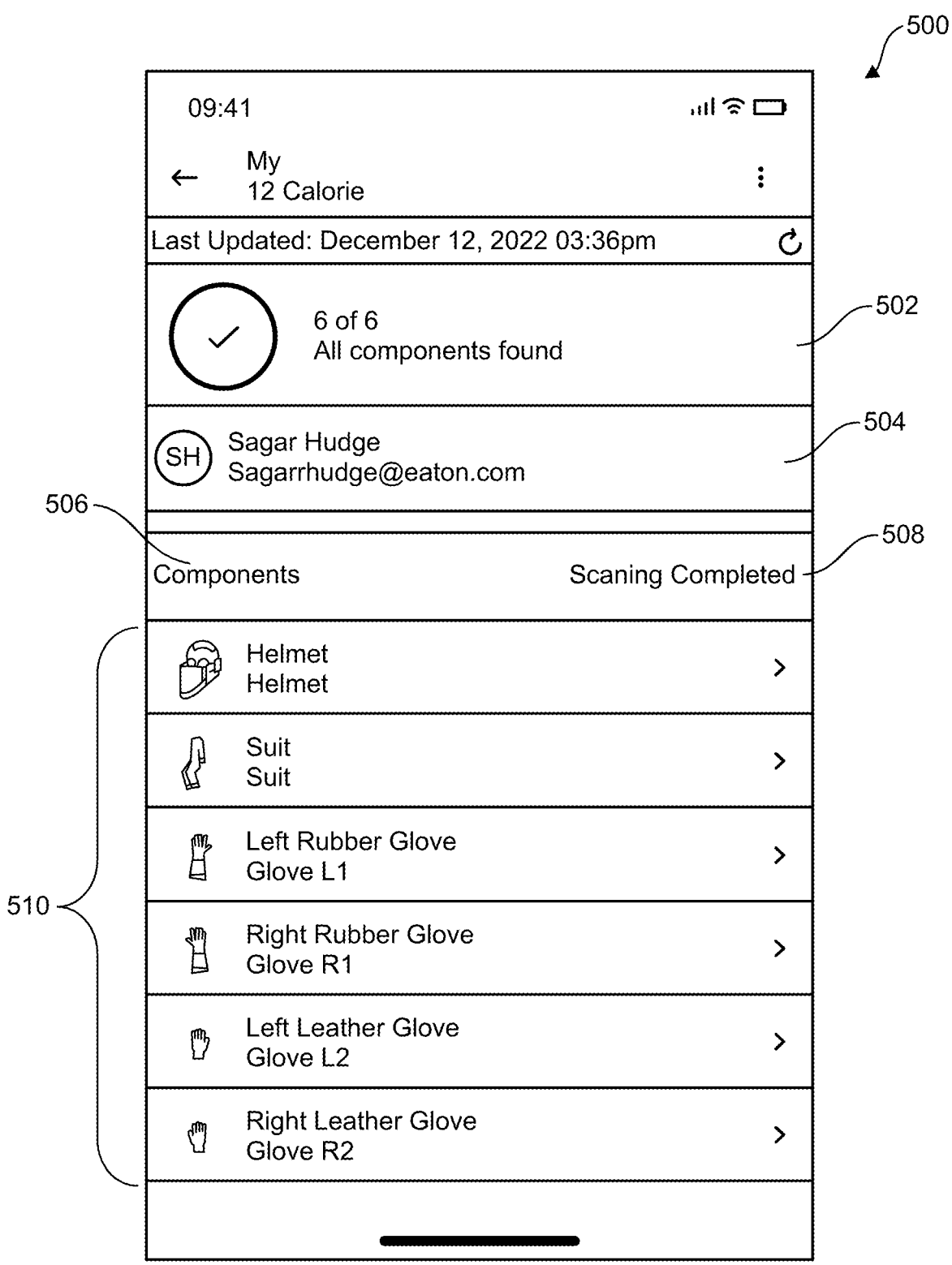
FIG. 5A and FIG. 5B depict examples graphical user interface (GUI) showing the status of safety equipment and safety gears according to an embodiment.
Figure 5B:
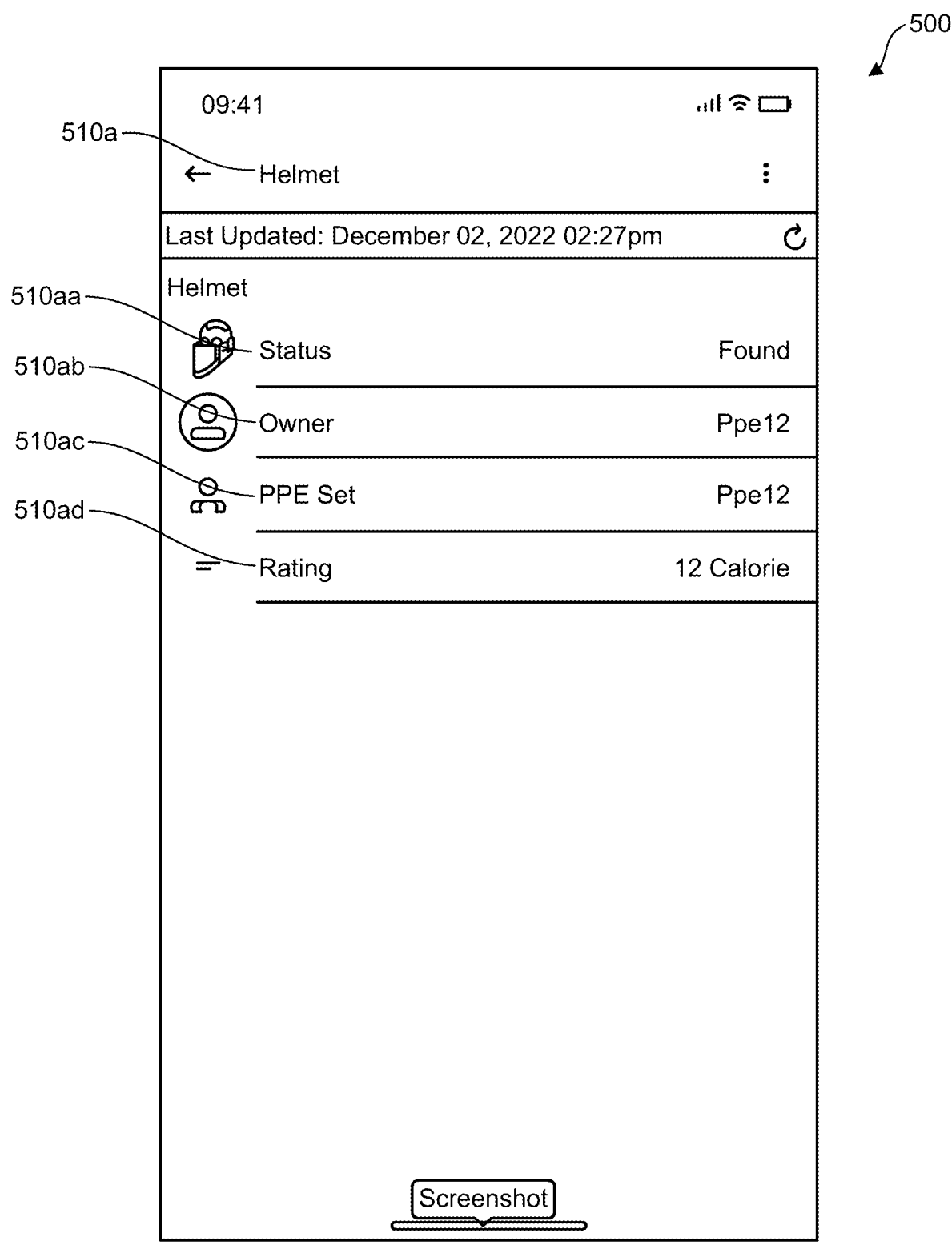

FIG. 5A and FIG. 5B depict examples graphical user interface (GUI) 500 showing the status of safety equipment and safety gears 510 according to an embodiment. In user interface 500 of FIG. 5A, a display may be provided to show number of gears or components present currently in the PPE 102. For example, 502 indicates number of components required to be 6 and number of components found to be 6 out 6. This means, required number of components are present in the PPE 102. Numeral 504 shows name of the wearer of the PPE. Numeral 506 shows list of components present in the PPE 102. For example, after scanning depicted 508 which includes acquiring the set of identification indicators, via the primary gear, by the mobile device 500, list of components may be displayed that is depicted with 506. The list of components 506 may include, listing of gears such as helmet, suit, left rubber glove, right rubber glove, left leather glove, right leather glove. In FIG. 5B, user interface 500 may display details of the safety gear helmet 510a which includes configuration details, status 510aa, details of wearer/owner 510ab wearing the helmet gear 510a, identifier tag detail of the PPE set 510 into which the helmet gear 510a may be present, and rating configuration 510ad of the helmet gear 510a which may be rated as 12 calories.

Figure 6:
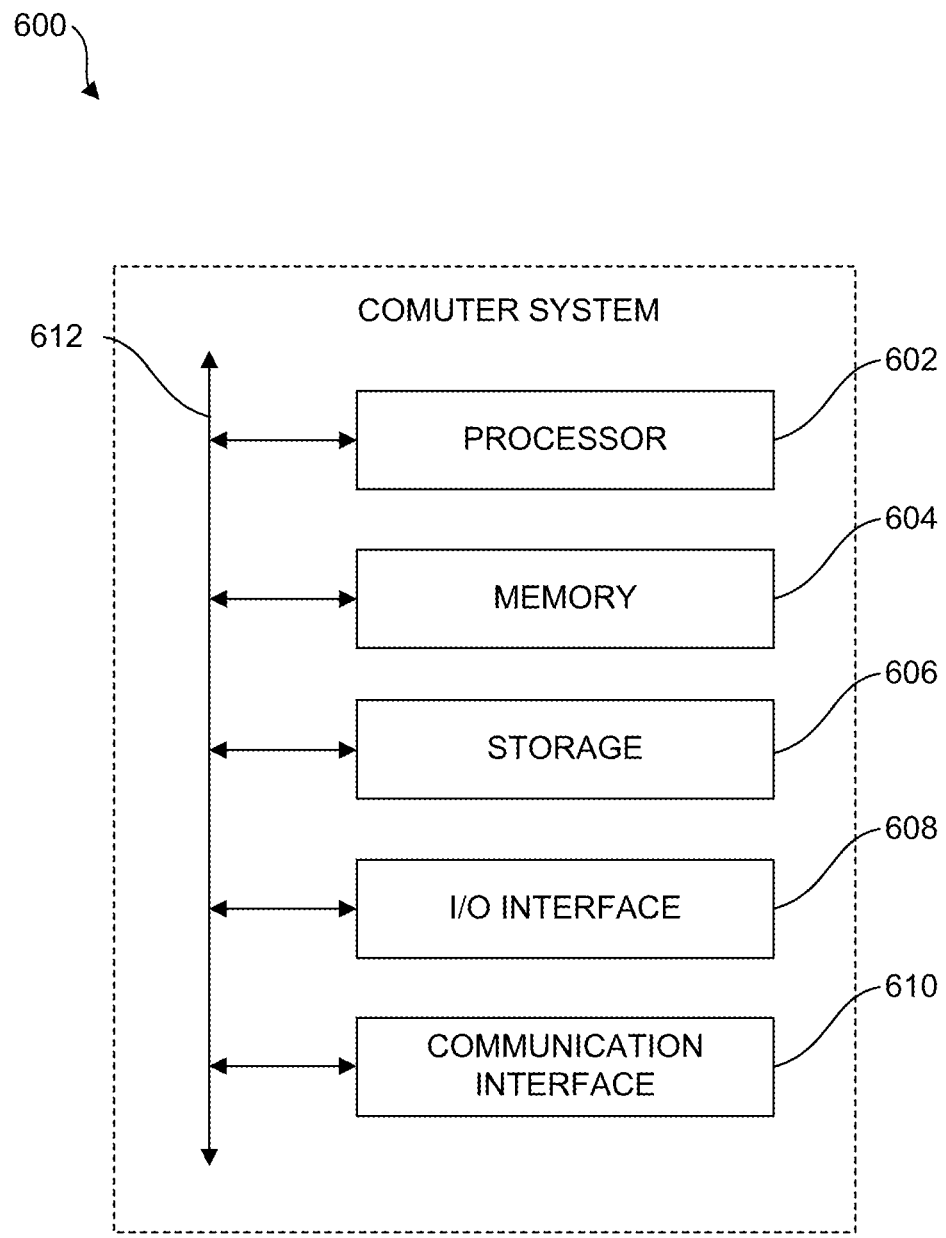
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example, and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally." unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method implemented with an equipment computing device associated with safety equipment, the method comprising:
    determining that the equipment computing device is in an environment that requires safety equipment to be worn;
    determining environmental data based on the determination that the equipment computing device is in the environment;
    determining operation metrics of the environment based on the environmental data;
    determining a list of predetermined safety gears and associated safety-related data that are applicable for the operation metrics;
    assigning one of first safety gears as a primary gear to analyze each of the first safety gears, wherein the first safety gears are available safety gears for the safety equipment, and wherein the primary gear is configured to communicate with the first safety gears through a wireless communication protocol to acquire identification indicators;
    acquiring, through the primary gear, a set of identification indicators including real-time operative information from each of the first safety gears;
    determining whether the safety gears are operating according to the determined operation metrics of the environment by comparing the acquired set of identification indicators with each of the predetermined safety gears and the associated safety-related data; and
    indicating, via a user interface, whether the first safety gears are operating according to the determined operation metrics of the environment.

2. The method of claim 1 further comprising using the primary gear for: detecting other safety equipments present at proximate, determine status of each of safety gears of other safety equipments, detecting whether each of safety gears of other safety equipments are rated with safety gear configuration, and verifying a set of the gears of the safety equipment for particular operation metrics.

3. The method of claim 1 further comprising detecting whether the first safety gears are rated with safety gear configuration according to particular operation metrics; detecting whether one or more safety gears are missing for operating according to the particular operation metrics of the environment; and detecting whether a user is missing the one or more safety gears with rated safety gear configuration when the acquired set of identification indicators including the real-time operative information of each of the first safety gears are detected to be not similar to each of the predetermined safety gears and the safety-related data of each of the predetermined safety gears.

4. The method of claim 1 further comprising detecting movements of each of the first safety gears based on communicating with any of motion sensors associated with the first safety gears and signal strength of each of the first safety gears for verifying whether the first safety gears are being worn.

5. The method of claim 1 further comprising:
    determining effect of the safety equipment on a user based on one or more factors including user comfort level, increased or decreased safety-related data and environmental data; and
    indicating the one or more factors via any of visual interface, audio interface, tactile interface, text, video interface, vibration, and radio-frequency signals indicating correction, calibration, or renewal of the first safety gears.

6. The method of claim 5, wherein the determining the effect of the safety equipment on the user is further based on one or more of temperature of the environment, wear, and tear of the one or more safety gears, and predicting factors impacted via the operation metrics of the environmental data.

7. The method of claim 1 further comprising storing in one or more logs the first safety gears present for particular operation metrics of the environment.

8. A system comprising:
an environment that requires a safety equipment to be worn;
an equipment computing device associated with the safety equipment;
one or more predetermined safety gears;
one or more processors; and
one or more computer-readable non-transitory storage media in communication with the one or more processors and comprising instructions, that when executed by the one or more processors, are configured to cause the system to:
determine that the equipment computing device is in an environment that requires safety equipment to be worn;
determine environmental data based on the determination that the equipment computing device is in the environment;
determine operation metrics of the environment based on the environmental data;
determine a list of the one or more predetermined safety gears and associated safety-related data that are applicable for the operation metrics;
assign one of first safety gears as a primary gear to analyze each of the first safety gears, wherein the first safety gears are available safety gears for the safety equipment, and wherein the primary gear is configured to communicate with the first safety gears through a wireless communication protocol to acquire identification indicators;
acquire, through the primary gear, a set of identification indicators including real-time operative information from each of the first safety gears;
determine whether the safety gears are operating according to the determined operation metrics of the environment by comparing the acquired set of identification indicators with each of the predetermined safety gears and the associated safety-related data; and
indicate, via a user interface, whether the first safety gears are operating according to the determined operation metrics of the environment.

9. The system of claim 8, wherein the instructions, when executed by the one or more processors, are further configured to cause the system to: use the primary gear for: detecting other safety equipments present at proximate, determine status of each of safety gears of other safety equipments, detecting whether each of safety gears of other safety equipments are rated with safety gear configuration, and verifying a set of the gears of the safety equipment for particular operation metrics.

10. The system of claim 8, wherein the instructions, when executed by the one or more processors, are further configured to cause the system to: detect whether the first safety gears are rated with safety gear configuration according to particular operation metrics; detecting whether one or more safety gears are missing for operating according to the particular operation metrics of the environment; and detecting whether a user is missing the one or more safety gears with rated safety gear configuration when the acquired set of identification indicators including the real-time operative information of each of the first safety gears are detected to be not similar to each of the predetermined safety gears and the safety-related data of each of the predetermined safety gears.

11. The system of claim 8, wherein the instructions, when executed by the one or more processors, are further configured to cause the system to: detect movements of each of the first safety gears based on communicating with any of motion sensors associated with the first safety gears and signal strength of each of the first safety gears for verifying whether the first safety gears are being worn.

12. The system of claim 8, wherein the instructions, when executed by the one or more processors, are further configured to cause the system to:
determine effect of the safety equipment on a user based on one or more factors including user comfort level, increased or decreased safety-related data and environmental data; and
indicating the one or more factors via any of visual interface, audio interface, tactile interface, text, video interface, vibration, and radio-frequency signals indicating correction, calibration, or renewal of the first safety gears.

13. The system of claim 12, wherein the determining the effect of the safety equipment on the user is further based on one or more of temperature of the environment, wear, and tear of the one or more safety gears, and predicting factors impacted via the operation metrics of the environmental data.

14. The system of claim 8, wherein the instructions, when executed by the one or more processors, are further configured to cause the system to: store in one or more logs the one or more safety gears present for particular operation metrics of the environment.

15. One or more computer-readable non-transitory storage media including instructions that, when executed by one or more processors of an equipment computing device, are configured to cause the one or more processors to:
determine that the equipment computing device is in an environment that requires safety equipment to be worn;
determine environmental data based on the determination that the equipment computing device is in the environment;
determine operation metrics of the environment based on the environmental data;
determine a list of predetermined safety gears and associated safety-related data that are applicable for the operation metrics;
assign one of first safety gears as a primary gear to analyze each of the first safety gears, wherein the first safety gears are available safety gears for the safety equipment, and wherein the primary gear is configured to communicate with the first safety gears through a wireless communication protocol to acquire identification indicators;
acquire, through the primary gear, a set of identification indicators including real-time operative information from each of the first safety gears;
determine whether the one or more safety gears are operating according to the determined operation metrics of the environment by comparing the acquired set of identification indicators with each of the predetermined safety gears and the associated safety-related data; and indicate, via a user interface, whether the first safety gears are operating according to the determined operation metrics of the environment.

16. The media of claim 15, wherein the instructions, when executed by the one or more processors of the equipment computing device, are further configured to: use the primary gear for: detecting other safety equipments present at proximate, determine status of each of safety gears of other safety equipments, detecting whether each of safety gears of other safety equipments are rated with safety gear configuration, and verifying a set of the gears of the safety equipment for particular operation metrics.

17. The media of claim 15, wherein the instructions, when executed by the one or more processors of the equipment computing device, are further configured to: detect whether the first safety gears are rated with safety gear configuration according to particular operation metrics; detecting whether one or more safety gears are missing for operating according to the particular operation metrics of the environment; and detecting whether a user is missing the one or more safety gears with rated safety gear configuration when the acquired set of identification indicators including the real-time operative information of each of the first safety gears are detected to be not similar to each of the predetermined safety gears and the safety-related data of each of the predetermined safety gears.

18. The media of claim 15, wherein the instructions, when executed by the one or more processors of the equipment computing device, are further configured to: detect movements of each of the first safety gears based on communicating with any of motion sensors associated with the first safety gears and signal strength of each of the first safety gears for verifying whether the first safety gears are being worn.

19. The media of claim 15, wherein the instructions, when executed by the one or more processors of the equipment computing device, are further configured to:

determine effect of the safety equipment on a user based on at least one of one or more factors including user comfort level, increased or decreased safety-related data and environmental data; and indicate the one or more factors via any of visual interface, audio interface, tactile interface, text, video interface, vibration, and radio-frequency signals indicating correction, calibration, or renewal of the first safety gears.

20. The media of claim 15, wherein the instructions, when executed by the one or more processors of the equipment computing device, are further configured to: store in one or more logs the first safety gears present for particular operation metrics of the environment.

* * * * *